United States Patent
Lundberg

(10) Patent No.: US 9,813,732 B2
(45) Date of Patent: Nov. 7, 2017

(54) SYSTEM AND METHOD FOR ENCODING VIDEO CONTENT USING VIRTUAL INTRA-FRAMES

(71) Applicant: AXIS AB, Lund (SE)

(72) Inventor: Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 283 days.

(21) Appl. No.: 14/411,324

(22) PCT Filed: Jun. 26, 2013

(86) PCT No.: PCT/EP2013/063364
§ 371 (c)(1),
(2) Date: Dec. 24, 2014

(87) PCT Pub. No.: WO2014/001381
PCT Pub. Date: Jan. 3, 2014

(65) Prior Publication Data
US 2015/0156511 A1   Jun. 4, 2015

Related U.S. Application Data

(60) Provisional application No. 61/665,855, filed on Jun. 28, 2012.

(51) Int. Cl.
*H04N 7/12* (2006.01)
*G06K 9/36* (2006.01)
(Continued)

(52) U.S. Cl.
CPC ......... *H04N 19/593* (2014.11); *H04N 19/114* (2014.11); *H04N 19/146* (2014.11);
(Continued)

(58) Field of Classification Search
CPC .. H04N 19/146; H04N 19/164; H04N 19/593; H04N 19/587; H04N 19/30; H04N 19/44; H04N 19/59
See application file for complete search history.

(56) References Cited

U.S. PATENT DOCUMENTS 6,240,136 B1   5/2001   Sauer
6,456,656 B1   9/2002   Adolph et al.
(Continued)

FOREIGN PATENT DOCUMENTS

CN   1368816 A   9/2002
CN   1650628 A   8/2005
(Continued)

OTHER PUBLICATIONS

International Search Report and Written Opinion issued by the European Patent Office on Jun. 26, 2013, in International Application No. PCT/EP2013/063364 (7 pages).
(Continued)

*Primary Examiner* — Tsion B Owens
(74) *Attorney, Agent, or Firm* — Finnegan, Henderson, Farabow, Garrett & Dunner, LLP

(57) ABSTRACT

Systems and methods are provided for encoding raw image content encoded using one or more virtual intra-frames. In an exemplary method, a stream of video content may be encoded to generate compressed video data that includes an intra-frame and a plurality of corresponding inter-frames. The compressed video data may be stored within a buffer, and when the amount of data in the buffer exceeds a threshold value, a virtual intra-frame may be computed based on decoded inter-frame data. The virtual intra-frame may be output for storage in the buffer.

26 Claims, 16 Drawing Sheets

(51) Int. Cl.

| | | |
|---|---|---|
| *H04N 19/593* | (2014.01) | |
| *H04N 19/30* | (2014.01) | |
| *H04N 19/114* | (2014.01) | |
| *H04N 19/146* | (2014.01) | |
| *H04N 19/156* | (2014.01) | |
| *H04N 19/164* | (2014.01) | |
| *H04N 19/177* | (2014.01) | |
| *H04N 19/423* | (2014.01) | |
| *H04N 19/587* | (2014.01) | |
| *H04N 19/59* | (2014.01) | |
| *H04N 19/44* | (2014.01) | |
| *G11B 27/034* | (2006.01) | |
| *H04N 21/234* | (2011.01) | |
| *H04N 21/2343* | (2011.01) | |
| *H04N 19/40* | (2014.01) | |

(52) U.S. Cl.
CPC ......... *H04N 19/156* (2014.11); *H04N 19/164* (2014.11); *H04N 19/177* (2014.11); *H04N 19/30* (2014.11); *H04N 19/423* (2014.11); *H04N 19/44* (2014.11); *H04N 19/587* (2014.11); *H04N 19/59* (2014.11); *G11B 27/034* (2013.01); *H04N 19/40* (2014.11); *H04N 21/23406* (2013.01); *H04N 21/23424* (2013.01); *H04N 21/23439* (2013.01)

(56) References Cited

U.S. PATENT DOCUMENTS

| | | |
|---|---|---|
| 6,483,875 B1 | 11/2002 | Hasebe et al. |
| 6,529,555 B1 | 3/2003 | Saunders et al. |
| 6,584,152 B2 | 6/2003 | Sporer et al. |
| 6,731,684 B1 | 5/2004 | Wu |
| 6,804,301 B2 | 10/2004 | Wu et al. |
| 7,058,130 B2 | 6/2006 | Liu et al. |
| 7,346,271 B2 | 3/2008 | Komi et al. |
| 7,636,395 B2 | 12/2009 | Yongfang et al. |
| 7,746,928 B2 * | 6/2010 | Wang ............... H04N 19/176 375/240.01 |
| 7,924,919 B2 | 4/2011 | Yatabe et al. |
| 8,681,858 B2 * | 3/2014 | Wang ............... H04N 19/172 375/240.03 |
| 2002/0106198 A1 | 8/2002 | Suzuki |
| 2004/0231004 A1 | 11/2004 | Seo |
| 2006/0034522 A1 * | 2/2006 | Mohsenian ........... H04N 19/15 382/232 |
| 2006/0088094 A1 | 4/2006 | Cieplinski et al. |
| 2006/0239563 A1 | 10/2006 | Chebil et al. |
| 2007/0174880 A1 | 7/2007 | Fite et al. |
| 2010/0195713 A1 * | 8/2010 | Coulombe ....... H04N 19/00163 375/240.02 |
| 2012/0002725 A1 | 1/2012 | Kazui |
| 2012/0014675 A1 * | 1/2012 | Previtali ............. G11B 27/034 386/328 |
| 2013/0182769 A1 * | 7/2013 | Yu ................... H04N 19/00587 375/240.16 |

FOREIGN PATENT DOCUMENTS

| | | |
|---|---|---|
| CN | 1756359 A | 4/2006 |
| CN | 101743753 A | 6/2010 |
| CN | 102450013 A | 5/2012 |
| EP | 0 695 088 | 1/1996 |
| EP | 0 737 013 | 10/1996 |
| EP | 1 437 894 | 7/2004 |
| WO | WO 03/007603 | 1/2003 |
| WO | WO-03/073768 A1 | 9/2003 |

OTHER PUBLICATIONS

"IP-Surveillance design guide: Setting up an IP-Surveillance system using Axis network cameras, video encoders and AXIS Camera Station software," Axis Communications, 2008 (50 pages).

* cited by examiner

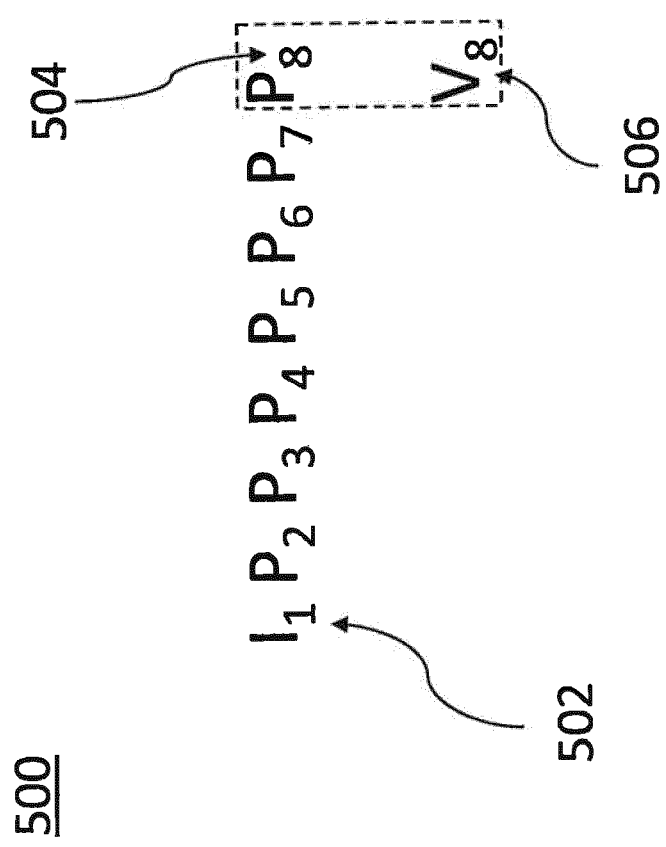

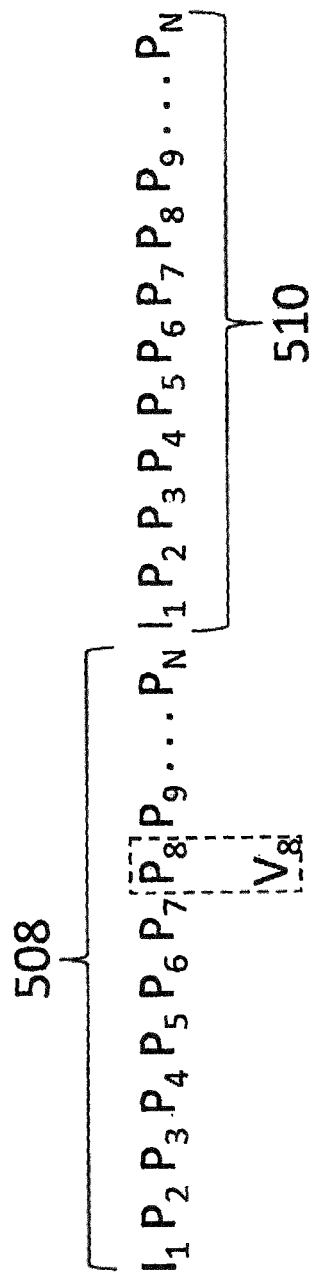

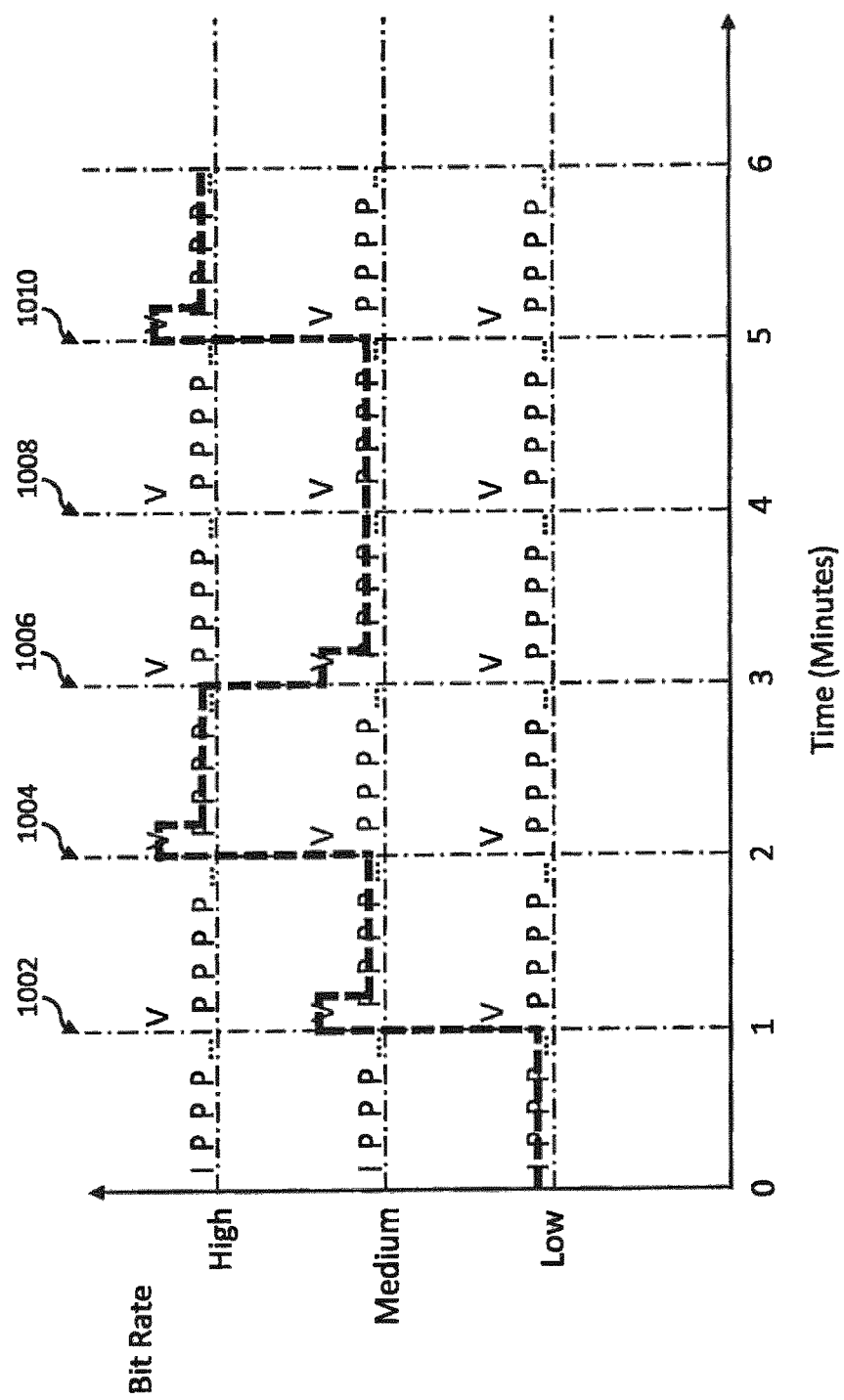

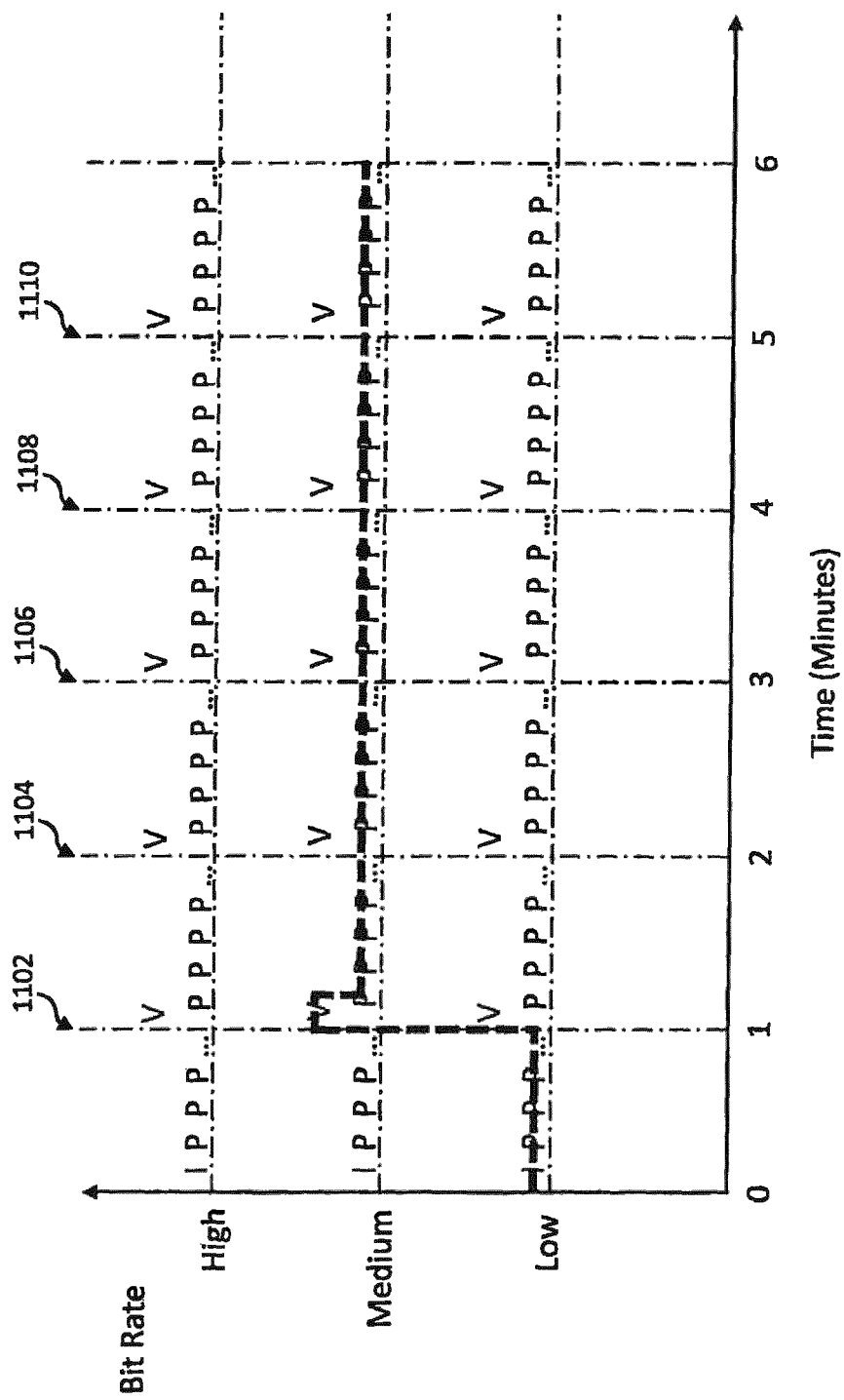

SYSTEM AND METHOD FOR ENCODING VIDEO CONTENT USING VIRTUAL INTRA-FRAMES

TECHNICAL FIELD

The present disclosure generally relates to systems and methods for encoding image data and generating compressed video content. More particularly, and without limitation, the present disclosure relates to systems and methods that generate virtual intra-frames to enable the buffering and delivery of compressed video content over a network.

BACKGROUND INFORMATION

Today, video systems incorporate digital network cameras that are capable of communicating image data using TCP/IP protocols. These video systems are displacing traditional surveillance systems that are based on analog closed-circuit television (CCTV) cameras. For example, and in contrast to analog CCTV cameras, video systems with digital network cameras capture and encode raw image data in real time to generate high-resolution compressed video content for continuous or discrete transmission to any number of recipients or storage devices.

Compressed, high-resolution video content may be transmitted to designated recipients for live viewing or storage devices for archiving, either continuously or alternatively. A network camera may transmit image data in response to, for example, one or more discrete triggering events or incidents. To achieve efficient bit-rate coding of the compressed video content, network cameras may include video codecs that employ differential encoding schemes. These encoding schemes may require large distances between intra-refresh frames. The compressed video content generated with such encoding schemes may have long group-of-picture (GOP) lengths that consume minimal network resources during transmission across a network.

Furthermore, and in contrast to the analog CCTV cameras, network cameras may also buffer a portion of the compressed video content, thereby enabling these network cameras to distribute compressed video content that brackets an event or incident of interest. However, due to the large distance between the intra-refresh frames, the use of long-GOP length codes in compressed video data increases the amount of memory necessary to store a complete sequence of encoded data. As a result, the limited buffer capacities of network cameras limit the ability of these cameras to buffer meaningful portions of the compressed video content.

In view of the foregoing, there is a need for improved systems and methods for encoding image data and generating compressed video content. Moreover, there is a need for improved systems and methods that generate virtual intra-frames to enable the buffering and delivery of compressed video content over a network. There is also a need for such systems and methods that support efficient, large GOP-length encoding of video data and the buffering of encoded frame data with a network camera having limited buffer memory. There is also a need for such systems and methods that can be implemented in a computer-based environment.

SUMMARY

Consistent with embodiments of the present disclosure, computer-implemented systems and methods are provided for encoding image data and generating compressed video content. In one exemplary embodiment, a method is provided that receives a stream of video content, encodes the video content stream using a video codec to generate compressed video data that includes an intra-frame and a plurality of corresponding inter-frames, and stores the compressed video data within a buffer. Consistent with the exemplary method, the encoding may include obtaining data associated with the encoded intra-frame and encoding, based on the intra-frame data, a portion of the video content stream to generate a corresponding one of the inter-frames. Further, the method may include determining whether an amount of data stored in the buffer exceeds a first threshold value. When the amount of data in the buffer exceeds the first threshold value, the method may include decoding the generated inter-frame, computing a virtual intra-frame based on the decoded inter-frame data, and outputting the virtual intra-frame with the corresponding inter-frame for storage in the buffer.

In an embodiment, a first portion of the video content stream may be encoded to generate the intra-frame. The first portion may, in such an embodiment, precede the portion of the video content stream associated with the inter-frame.

In another embodiment, when the amount of buffered data fails to exceed the first threshold value, the encoding step may include computing a group-of-pictures length associated with the compressed video data. The encoding step may also include determining whether the computed group-of-pictures length exceeds a predetermined threshold length, and when the computed group-of-pictures length does not exceed the predetermined threshold length, an additional portion of the video content stream may be encoded to generate an additional inter-frame. In such an embodiment, the buffer may include one or more previously-encoded groups of intra-frames and corresponding inter-frames, and when the computed group-of-pictures length exceeds the predetermined threshold length, the exemplary method may discard the previously encoded groups of intra-frames and corresponding inter-frames.

In a further embodiment, the encoding step may also include determining whether the amount of buffered data exceeds a second threshold value that is larger than the first threshold value. In such an embodiment, the virtual intra-frame may be maintained and the encoded video content preceding the virtual intra-frame may be discarded when the amount of buffered data exceeds the second threshold value.

In an additional embodiment, information indicative of a triggering incident may be received, and based on the received information; the exemplary method may generate an instruction to transmit at least a portion of the buffered data to a recipient. The triggering incident may, in such an embodiment, include at least one of a request for video content, an occurrence of a predetermined event within the received video stream, a receipt of predetermined data through an interface, or a detection of a predetermined event by a sensor.

Furthermore, the step of generating the instruction may also include determining whether the buffered data includes the intra-frame and the virtual intra-frame. In such an embodiment, the virtual intra-frame may be discarded and the corresponding inter-frame may be maintained when the buffered data includes the intra-frame and the virtual intra-frame, and the buffered data portion may then be generated based on the intra-frame. In a further embodiment, the exemplary method may determine whether the buffered data includes the virtual intra-frame and fails to include the intra-frame, and may then generate the buffered data portion based on the virtual intra-frame, when the buffered data includes the virtual intra-frame and fails to include the intra-frame.

In yet another embodiment, the exemplary method may further include receiving and decoding at least one frame of compressed video data, determining whether the decoded frame corresponds to an intra-frame, and storing at least the decoded frame in a data repository, when the decoded frame corresponds to an intra-frame. In such an embodiment, the method may determine that the decoded frame corresponds to an inter-frame, and when the decoded frame is an inter-frame, compute a group-of-pictures length associated with the received data. The exemplary method may determine whether the computed group-of-pictures length exceeds a predetermined threshold length, and when the computed group-of-pictures length fails to exceed the predetermined threshold length, the exemplary method may store at least the decoded inter-frame within the data repository.

Further, in such an embodiment, and when the computed group-of-pictures length exceeds the predetermined threshold length, the method may generate an additional intra-frame based on the decoded inter-frame data, and may then store at least the additional intra-frame within the data repository.

In a further embodiment, the compressed video content may be associated with a corresponding value of a bit rate, and at least one switching point may be established at a corresponding temporal position within the compressed video content. In such an embodiment, the switching point may enable at least one of a recipient or a distributor of the compressed video content to modify the bit rate.

In such an embodiment, the exemplary method may generate an instruction to store the compressed video data and information associated with the switching position in a data repository. Further, in establishing the switching point, the exemplary method may identify an inter-frame associated with the corresponding temporal position, decode the identified inter-frame and compute a virtual intra-frame based on the decoded inter-frame data, and then output the virtual intra-frame for storage in the data repository at the temporal position.

In an additional embodiment, the encoding step may also include establishing a plurality of switching points at corresponding temporal positions within the compressed video content. The corresponding temporal positions may, in an embodiment, be disposed at fixed intervals within the compressed video content.

In a further embodiment, the exemplary method may receive a request to create the switching position that includes information identifying a temporal position within the compressed video content, and the encoding step may further include establishing the switching point at the identified temporal position, in response to the request.

Consistent with further embodiments of the present disclosure, an apparatus is provided that includes a video codec unit configured to encode a stream of video content to generate compressed video data that includes an intra-frame and a plurality of corresponding inter-frames. The apparatus further includes a storage device coupled to the video codec unit and configured to store the compressed video data within a buffer. The video codec may be further configured to obtain data associated with the encoded intra-frame, encode, based on the intra-frame data, a portion of the video content stream to generate a corresponding one of the inter-frames, and determine whether an amount of data stored in the buffer exceeds a first threshold value. When the amount of buffered data exceeds the first threshold value, the video codec may decode the generated inter-frame, compute a virtual intra-frame based on the decoded inter-frame data, and provide the virtual intra-frame with the corresponding inter-frame as output for storage in the buffer.

In an embodiment, the video codec may be further configured to encode a first portion of the video content stream to generate the intra-frame. The first portion may, in such an embodiment, precede the portion of the video content stream associated with the inter-frame.

In another embodiment, when the amount of buffered data fails to exceed the first threshold value, the video codec may be configured to compute a group-of-pictures length associated with the compressed video data. The video codec may also be configured to determine whether the computed group-of-pictures length exceeds a predetermined threshold length, and when the computed group-of-pictures length fails to exceed the predetermined threshold length, the video codec may be configured to encode an additional portion of the video content stream to generate an additional inter-frame. In such an embodiment, the buffer may include one or more previously-encoded groups of intra-frames and corresponding inter-frames, and when the computed group-of-pictures length exceeds the predetermined threshold length, the video codec may be further configured to discard the previously-encoded groups of intra-frames and corresponding inter-frames.

In a further embodiment, the video codec may be configured to determine whether the amount of buffered data exceeds a second threshold value that is larger than the first threshold value. The video codec may, in such an embodiment, be further configured to maintain the virtual intra-frame and discard encoded video content preceding the virtual intra-frame, when the amount of buffered data exceeds the second threshold value.

In an additional embodiment, the video codec may be configured to receive information indicative of a triggering incident, and based on the received information, generate an instruction to transmit at least a portion of the buffered data to a recipient. In such an embodiment, the video codec may be configured to determine that the buffered data includes the intra-frame and the virtual intra-frame, to discard the virtual intra-frame and maintain the corresponding inter-frame, when the buffered data includes the intra-frame and the virtual intra-frame, and to generate the buffered data portion based on the intra-frame. In a further embodiment, the video codec may be configured to determine whether the buffered data includes the virtual intra-frame and fails to include the intra-frame, and when the buffered data includes the virtual intra-frame and fails to include the intra-frame, to generate the buffered data portion based on the virtual intra-frame.

In yet another embodiment, the video codec may be configured to receive and decode at least one frame of compressed video data, determine whether the decoded frame corresponds to an intra-frame, and when the decoded frame corresponds to an intra-frame, generate an instruction to store at least the decoded frame in the storage device. In such an embodiment, the video codec may also be configured to determine that the decoded frame corresponds to an inter-frame, and when the decoded frame is an inter-frame, compute a group-of-pictures length associated with the received data. The video codec may then be configured to determine whether the computed group-of-pictures length exceeds a predetermined threshold length, and generate an instruction to store at least the decoded inter-frame within the storage device, when the computed group-of-pictures length fails to exceed the predetermined threshold length.

Further, in such an embodiment, the video codec may be configured to generate an additional intra-frame based on the decoded inter-frame data, when the computed group-of-pictures length exceeds the predetermined threshold length, and then to generate an instruction to store at least the additional intra-frame within the storage device.

In a further embodiment, the compressed video content may be associated with a corresponding value of a bit rate, and the video codec may be configured to establish at least one switching point at a corresponding temporal position within the compressed video content. In such an embodiment, the switching point may enable at least one of a recipient or a distributor of the compressed video content to modify the bit rate.

In such an embodiment, the video codec may be configured to generate an instruction to store the compressed video data and information associated with the switching position in the storage device. The video codec may also be configured to identify an inter-frame associated with the corresponding temporal position, decode the identified inter-frame and computing a virtual intra-frame based on the decoded inter-frame data, and output the virtual intra-frame for storage in the storage device at the temporal position.

In an additional embodiment, the video codec may be configured to establish a plurality of switching points at corresponding temporal positions within the compressed video content. The corresponding temporal positions may, in such an embodiment, be disposed at fixed intervals within the compressed video content. Furthermore, in an embodiment, the video codec may be configured to receive a request to create the switching position that includes information identifying a temporal position within the compressed video content, and to establish the switching point at the identified temporal position, in response to the request.

Consistent with additional embodiments of the present disclosure, a tangible, non-transitory computer-readable medium that stores instructions that, when executed by at least one processor, cause the at least one processor to perform the steps of receiving a stream of video content, encoding the video content stream to generate compressed video data that includes an intra-frame and a plurality of corresponding inter-frames, and storing the compressed video data within a buffer. The set of instructions may further cause the at least one processor to obtain data associated with the encoded intra-frame and encode, based on the intra-frame data, a portion of the video content stream to generate a corresponding one of the inter-frames. In addition, the set of instructions may cause the at least one processor to determine whether an amount of data stored in the buffer exceeds a first threshold value. When the amount of data in the buffer exceeds the first threshold value, the set of instructions may cause the at least one processor to decode the generated inter-frame, compute a virtual intra-frame based on the decoded inter-frame data, and output the virtual intra-frame with the corresponding inter-frame for storage in the buffer.

Consistent with another embodiment of the present disclosure, a computer-implemented method receives information indicative of a network condition associated with a communications network, and determines, based on the information, whether an initial bit rate of compressed video content transmitted across the communications network is consistent with the network condition. When the initial bit rate is inconsistent with the network condition, a switching point associated with the initial bit rate of the compressed video content is identified. The switch point being may be associated with a corresponding temporal position within the compressed video content. Using a video codec, an instruction is generated to transmit a portion of the compressed video content at a modified bit rate at the temporal position of the switch point. The portion may include a virtual intra-frame and corresponding intra-frames encoded at the modified bit rate.

In an embodiment, when the initial bit rate is consistent with the network condition, the exemplary method may generate an instruction to transmit the compressed video content at the initial bit rate. Further, when the initial bit rate is inconsistent with the network condition, the exemplary method may obtain the portion of compressed video content at the modified bit rate. The modified bit rate may, in such an embodiment, be consistent with the network condition at the temporal position of the switch point.

In an additional embodiment, the exemplary method may determine that a bit rate associated with the network condition exceeds the initial bit rate when the initial bit rate is inconsistent with the network condition, and may further obtain the portion of compressed video content at the modified bit rate. In such an embodiment, the modified bit rate may exceed the initial bit rate at the temporal position of the switch point.

In another embodiment, when the initial bit rate is inconsistent with the network condition, the exemplary method may determine that the initial bit rate exceeds a bit rate associated with the network condition, and may then obtain the portion of compressed video content at the modified bit rate. In such an embodiment, the initial bit rate may exceed the modified bit rate at the temporal position of the switch point.

In a further embodiment, the method may include receiving a request for the compressed video content that information identifying the initial bit rate, and generating an instruction to transmit the compressed video content at the initial bit rate, in response to the request. In such an embodiment, the method may generate an instruction to transmit playback information associated with the compressed video content. The playback information may include information identifying the temporal position of the switch point within the compressed video content.

Consistent with another embodiment of the present disclosure, an apparatus is provided that includes a storage device and a video codec coupled to the storage device. The video codec may be configured to receive information indicative of a network condition associated with a communications network. and determine, based on the information, whether an initial bit rate of compressed video content transmitted across the communications network is consistent with the network condition. When the initial bit rate is inconsistent with the network condition, the video codec is further configured to identify a switching point associated with the initial bit rate of the compressed video content. The switch point may be associated with a corresponding temporal position within the compressed video content. The video codec is further configured to generate an instruction to transmit a portion of the compressed video content at a modified bit rate at the temporal position of the switch point. The portion may include a virtual intra-frame and corresponding intra-frames encoded at the modified bit rate.

In an embodiment, when the initial bit rate is consistent with the network condition, the video codec may be further configured to generate an instruction to transmit the compressed video content at the initial bit rate. The video codec may also be configured to obtain, when the initial bit rate is inconsistent with the network condition, the portion of compressed video content at the modified bit rate. The modified bit rate may, in such an embodiment, be consistent with the network condition at the temporal position of the switch point.

In an additional embodiment, the video codec may be configured to determine that a bit rate associated with the network condition exceeds the initial bit rate, when the initial bit rate is inconsistent with the network condition, and then obtain the portion of compressed video content at the modified bit rate. In such an embodiment, the modified bit rate may exceed the initial bit rate at the temporal position of the switch point.

In another embodiment, when the initial bit rate is inconsistent with the network condition, the video codec may be configured to determine that the initial bit rate exceeds a bit rate associated with the network condition, and obtain the portion of compressed video content at the modified bit rate. The initial bit rate may, in such an embodiment, exceed the modified bit rate at the temporal position of the switch point.

In a further embodiment, the video codec may be configured to receive a request for the compressed video content that includes information identifying the initial bit rate, and generate an instruction to transmit the compressed video content at the initial bit rate, in response to the request. The video codec may also be configured to generate an instruction to transmit playback information associated with the compressed video content. The playback information may, in such an embodiment, include information identifying the temporal position of the switch point within the compressed video content.

Other embodiments of the present disclosure relate to a tangible, non-transitory computer-readable medium storing instructions that, when executed by at least one processor, cause the at least one processor to perform the steps of receiving information indicative of a network condition associated with a communications network, and determining, based on the information, whether an initial bit rate of compressed video content transmitted across the communications network is consistent with the network condition. When the initial bit rate is inconsistent with the network condition, a switching point associated with the initial bit rate of the compressed video content is identified. The switch point being may be associated with a corresponding temporal position within the compressed video content. An instruction is generated to transmit a portion of the compressed video content at a modified bit rate at the temporal position of the switch point. The portion may include a virtual intra-frame and corresponding intra-frames encoded at the modified bit rate.

Further embodiments of the present disclosure relate to a computer-implemented method that receives a stream of video content comprising at least one frame of compressed video data. The method decodes the received frame, and determines whether the decoded frame corresponds to an inter-frame. When the decoded frame is an inter-frame, the method computes a group-of-pictures length associated with the received data and determines whether the computed group-of-pictures length exceeds a predetermined threshold length. When the computed group-of-pictures length exceeds the predetermined threshold length, a video codec generates an additional intra-frame based on the decoded inter-frame data. At least the additional intra-frame is stored within the data repository.

In an embodiment, the exemplary method may store at least the decoded frame in a data repository, when the decoded frame corresponds to an intra-frame. The exemplary method may also store at least the decoded inter-frame within the data repository, when the computed group-of-pictures length fails to exceed the predetermined threshold length.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate embodiments of the present disclosure and together with the description, serve to explain principles of the invention as set forth in the accompanying claims.

FIGS. 5A-5C illustrate exemplary buffered frame sequences that include virtual intra-frames, consistent with disclosed embodiments.

FIGS. 10A-10B and 11A-11B illustrate exemplary adjustments to a transmission bit rate of encoded video content, consistent with disclosed embodiments.

DETAILED DESCRIPTION OF THE EXEMPLARY EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
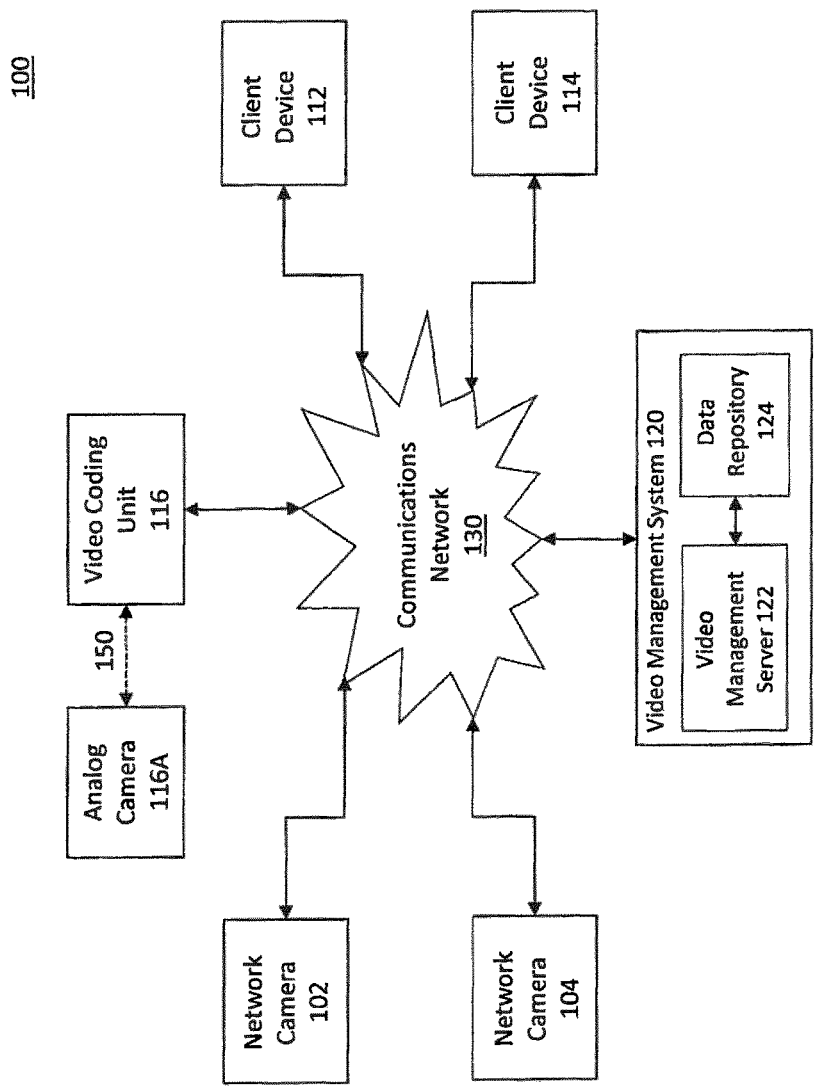
FIG. 1 is a diagram of an exemplary computing environment within which embodiments consistent with the present disclosure may be practiced.

FIG. 1 illustrates an exemplary computing environment 100 within which embodiments consistent with the present disclosure may be practiced. As shown in FIG. 1, environment 100 may be implemented with an IP-based or network video surveillance system that enables video content to be captured, encoded, and subsequently stored at various locations in communication with a communications network 130. The number and arrangement of components in FIG. 1 is provided for purposes of illustration and, as will be apparent to one of skill in the art from this disclosure, the number of components may be increased or decreased and/or modifications may be made to the arrangement of components, according to the intended needs or objectives of environment 100.

In the exemplary embodiment of FIG. 1, environment 100 includes a plurality of digital network cameras 102 and 104, a plurality of client devices 112 and 114, a video encoder unit 116, and a video management system 120 interconnected via communications network 130. Further, as depicted in FIG. 1, one or more analog camera(s) 116A (e.g., a closed-circuit television (CCTV) camera) may be disposed in communication with one or more video encoder unit(s) 116 via connection 150. In such embodiments, connection 150 may correspond to any wired or wireless connection, including those apparent to one of skill in the art and capable of carry data to and from analog camera 116A and video encoder unit 116.

In FIG. 1, digital network cameras 102 and 104 may be configured to continuously capture raw image data, which may be encoded in near real time to generate compressed video content. Similarly, analog camera 116A may be configured to continuously capture raw image data, which may be transferred to video encoder unit 116 across connection 150 for subsequent encoding. In such embodiments, the encoding performed by network cameras 102 and 104 and by video encoding unit 116 may generate compressed video content suitable for transmission across network 130 either continuously, at specified intervals, or in response to a predetermined triggering incident.

In an embodiment, the raw image data obtained by video encoding unit 116 and network cameras 102 and 104 may be encoded in accordance with a differential encoding scheme to generate groups of pictures (GOPs) that include, respectively, intra-frames (i.e., I-frames) and corresponding sequential sets of inter-frames (i.e., P-frames). For example, the raw image data may be encoded in accordance with the H.264 standard for high definition video, with the H.265 standard for high efficiency video coding, or with any additional or alternate differential encoding standard apparent to one of skill in the art.

Further, in embodiments consistent with the present disclosure, video encoding unit 116 and network cameras 102 and 104 may be configured to encode the raw image data at a plurality of bit rates for subsequent transmission across network 130. For example, the bit rate selected for encoding the raw image data may depend a condition of network 130 (e.g., a bandwidth of network 130), a condition of a recipient of the compressed image data (e.g., client device 102 or video management system 120), or any additional or alternate condition apparent to one of skill in the art and appropriate to video encoding unit 116 and network cameras 102 and 104.

Referring again to FIG. 1, client devices 112 and 114 may be implemented with at least one processor or a computer-based system. For example, client devices 112 and 114 can include, but are not limited to, a personal computer, a laptop computer, a notebook computer, a hand-held computer, a personal digital assistant, a portable navigation device, a mobile phone, a smart phone, a set top box, a third party portal, a video decoder box or dongle with a dedicated display device, and any additional or alternate computing device operable to transmit and receive data across network 130.

Communications network 130 may be implemented with any combination of wired and/or wireless networks for providing digital data communication. Examples of communication network 120 include a local area network ("LAN"), a wireless LAN, e.g., a "WiFi" network, a wireless Metropolitan Area Network (MAN) that connects multiple wireless LANs, and a wide area network ("WAN"). In some embodiments, communications network 130 comprises the Internet. For example, consistent with embodiments of the present disclosure, network 130 may comprise the Internet and include any publicly-accessible network or networks interconnected via one or more communication protocols, including, but not limited to, the hypertext transfer protocol (HTTP), transmission control protocol/internet protocol (TCP/IP), and Real-time Transport Protocol (RTP/RTCP). Moreover, communications network 130 may also include one or more mobile device networks, such as a GSM network or a PCS network, that allow client devices 112 and 114, network cameras 102 and 104, and video management system 120 to send and receive data via applicable communications protocols, including those described above.

Video management system 120 may include a video management server 122 and a data repository 124. For example, video management server 122 may include a front end and a back end, which is disposed in communication with the front end. In such embodiments, the front and back ends of server 122 may be incorporated into a hardware unit, for example, a single computer, a single server, or any additional or alternate computing device apparent to one or skill in the art. Further, in an embodiment, the front end may be a software application, such as a web service, executing on server 122, that enables a user of a client device (e.g., client devices 112 and 114) to access, manage, and view compressed video content stored within data repository 124.

Data repository 124 may store compressed video content encoded at one or more of a plurality of bit rates by video coding unit 116 and network cameras 102 and 104. For example, as discussed above, one or more of video coding unit 116 and network cameras 102 and 104 may transmit the compressed video content across network 130 to data repository 124 for storage recording either continuously, at specified intervals, or in response to a predetermined triggering incident.

As described above, network cameras 102 and 104 and video codec unit 116 may incorporate one or more video codecs in communication with corresponding processors and storage units to obtain raw image data, encode the raw image data to generate compressed video content, and subsequently buffer a portion of the compressed video data within the storage unit. In such embodiments, the codecs and processors may be combined into an on-chip apparatus that includes a sensor interface unit, a video codec unit, and a processing unit that includes logic to control the sensor interface and video codec units, and to interface with client devices 112 and 114 and video management system 120 across network 130, as described below with reference to FIG. 2, for example.

Figure 2:
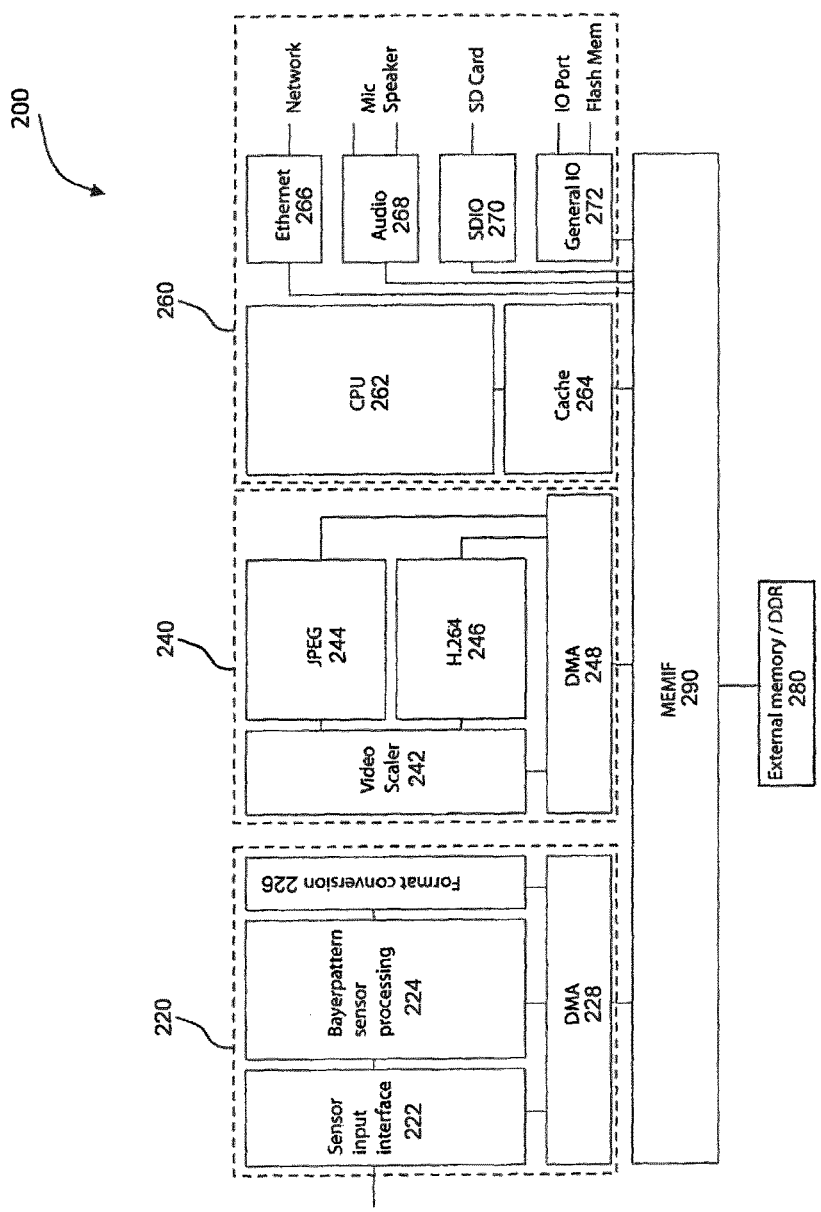
FIG. 2 is a diagram of an exemplary on-chip video codec, consistent with disclosed embodiments.

FIG. 2 illustrates an exemplary on-chip video codec 200 that encodes raw image data to generate compressed video content, in accordance with disclosed embodiments. By way of example, video codec 200 may be incorporated into one or more of network cameras 102 and 104 and video coding unit 116 to continuously encode raw image data to generate compressed video content.

In the exemplary embodiment of FIG. 2, video codec 200 includes a sensor unit 220, a codec unit 240, and a processing unit 260. Further, a memory interface 290 of FIG. 2 may couple sensor unit 220, codec unit 240, and processing unit 260 to an external storage unit 280. In such embodiments, sensor unit 220 may receive and process raw image data into a format suitable for encoding by codec unit 240. Codec unit 240 may encode the formatted raw image data to generate compressed video data, a portion of which may be buffered within storage device 280. Further, in such embodiments, the compressed video content may be transmitted across a communications network (e.g., network 130) for viewing and/or storage in response to an instruction generated by processing unit 260.

Further, although not depicted in FIG. 2, the raw image data that is captured by image sensors may be incorporated into network cameras 102 and 104. Image sensors consistent with the disclosed embodiments include, but are not limited to, digital charge-coupled device (CCD) image sensors and complementary metal-oxide-semiconductor (CMOS) image sensors. Additionally, the raw image data obtained by video encoding unit 116 may be captured by one or more analog cameras (e.g., analog camera 116A) using an appropriate image sensor, and may be subsequently provided to video coding unit 116 using connection 150.

Referring back to FIG. 2, sensor unit 220 includes a sensor input interface 222 that receives the image data from an image sensor, a Bayer pattern processor 224 that applies a color filter to the raw image data, and a format converter 226 that converts a format of the filtered image data. Sensor unit 220 is not limited to such exemplary configurations, and in further embodiments, sensor unit 220 may be configured to execute one or more additional image processing algorithms, which include, but are not limited to, a dead pixel concealment algorithm, a noise filtering algorithm, an image sharpening algorithm, a white balance algorithm, an exposure algorithm, and an image autofocus algorithm. Sensor unit also includes a direct memory access (DMA) controller 228 that enables sensor unit 220 to directly access storage unit 280 through interface 290, and to provide the filtered image data to codec unit 240 though interface 290.

Codec unit 240 includes a video scaler 242, which may receive the filtered image data from sensor unit 220 through interface 290 using a corresponding direct memory access (DMA) controller 248. Once processed by video scaler 242, the scaled image data may be forwarded to one or more of encoder 244 or encoder 246. For example, encoder 244 may compress the scaled image data to generate a corresponding JPEG-compressed image, which may be forwarded by DMA controller 248 to storage unit 280, or alternatively, to processing unit 260 for subsequent transmission across network 130.

Additionally or alternatively, encoder 246 may differentially encode the scaled image data in accordance with the H.264 standard for high definition video to generate a corresponding frame of compressed video data. For example, the generated frame may form a portion of a group of differentially-encoded frames having a corresponding group-of-pictures (GOP) length. In such embodiments, DMA controller 248 may forward the compressed video data to storage unit 280 for buffering, and additionally or alternatively, to processing unit 260 for transmission across network 130.

Processing unit 260 includes a central processing unit (CPU) 262, corresponding cache 264, a network interface 266 that connects to network 130 using one or more of the communications protocols outlined above. Processing unit also includes an auditory interface 268 that accepts input from a microphone or provides output to a speaker, an interface 270 that accepts a secure digital (SD) card, and a general interface 272 for communicating with one or more peripheral devices (e.g., an input/output device such as a keypad or touch screen, and an external memory device, such as a hard disk or flash drive).

In an embodiment, processing unit 260 may generate a signal to store the compressed video content within a locally-accessible storage device using a corresponding interface (e.g., a SD card using SD card interface 270 or a flash device using general interface 272). In additional embodiments, processing unit 260 may also generate a signal to either continuously transmit compressed video content generated by codec unit 240 to a corresponding recipient for viewing or storage, or alternatively, to transmit compressed video content to the corresponding recipient for viewing or storage at predetermined times. The disclosed embodiments are, however, not limited to such mechanisms for local storage and transmission, and in additional embodiments, processing unit 260 may receive signals from one or more of network interface 266, auditory interface 268, SD card interface 270, or general I/O interface 272 that identify an incident triggering a transfer of compressed video content.

For example, such triggering incidents include, but are not limited to, a request from a user of a client device, a signal received from a sensor unit (e.g., a motion sensor, an infrared sensor, a thermal sensor, and a relay or door contact sensor), a signal received from a microphone in communication with auditory interface, a signal or an alarm generated by an additional networked device (e.g., an additional network camera) and transmitted to processing unit 260 over a communications network (e.g., network 130), or any additional or alternate event apparent to one of skill in the art. In such embodiments, a user of a client device (e.g., client device 112 or 104) may provide configuration information to one or more of network cameras 102 and 104 that specify one or more triggering incidents and one or more corresponding destinations to receive compressed data.

Further, as described above, DMA controller 248 may transmit compressed video content to storage device 280, which may acts as a buffer to temporarily store the compressed video content. Upon identification of a triggering event, processing unit 260 may also generate an instruction to transmit the buffered video content across network 130 to the designated recipient or location for viewing or storage. In such embodiments, video codec 200 may facilitate the delivery of not only compressed video content corresponding to raw image data subsequent to a triggering incident, but also a buffered portion of the compressed video data captured within a predetermined time period prior to the triggering incident.

As described above, the on-chip codec systems of network cameras 102 and 104 encode raw image data in accordance with one or more differential encoding schemes, including, but not limited to, schemes consistent with the H.264 standard for high definition video and the H.265 standard for high efficiency video coding. Using such differential encoding schemes, raw image data is encoded into groups of frames having corresponding group-of-picture (GOP) lengths and including an initial intra-frame (i.e., an I-frame) and a plurality of inter-frames (i.e., P-frames)

predicted on the basis of the I-frame, as described below with reference to FIG. 3, for example.

Figure 3:
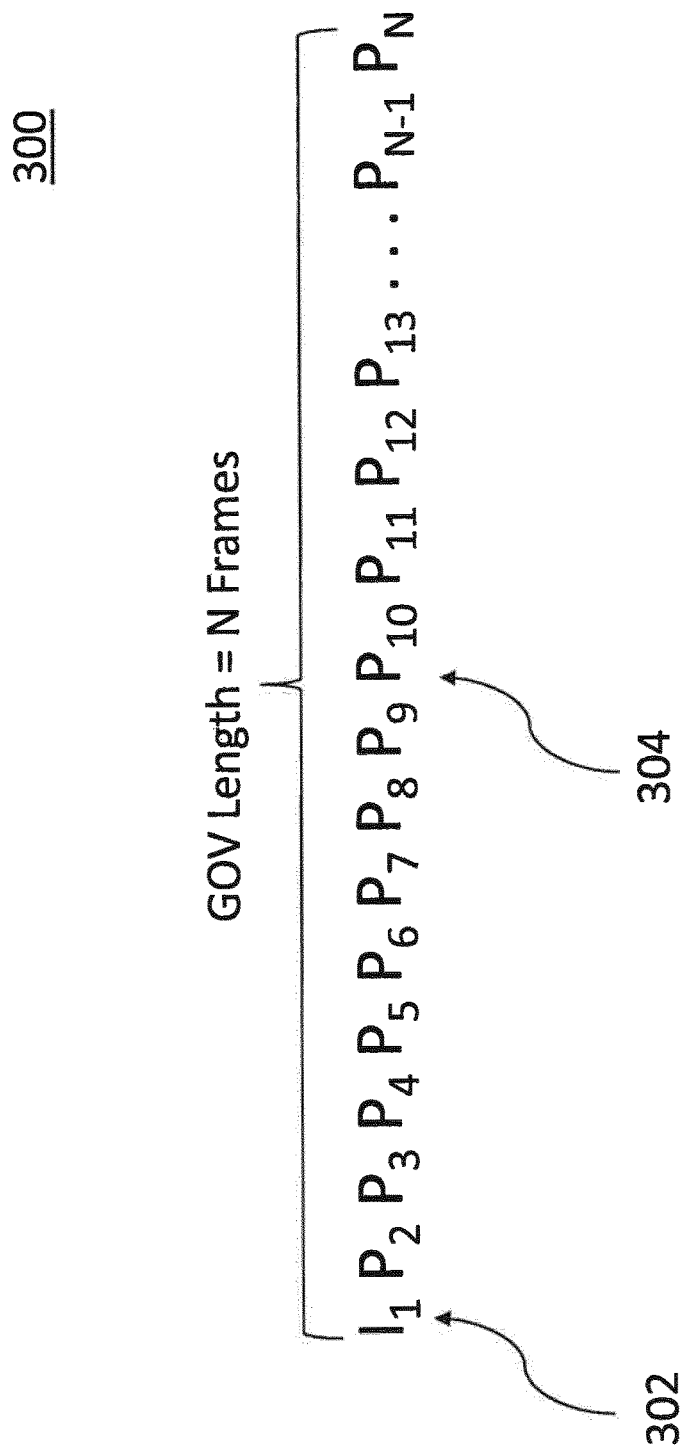
FIG. 3 illustrates an exemplary group of encoded frames of video content, consistent with disclosed embodiments.

FIG. 3 illustrates an exemplary group 300 of differentially-encoded frames, in accordance with embodiments of the present disclosure. For example, group 300 may be generated by a video codec (e.g., on-chip video codec 200) incorporated within at least one of a network camera (e.g., network cameras 102 and 104) or a video coding unit in communication with an analog camera (e.g., video coding unit 116), and may be based on raw image data captured by image sensors of the network camera and/or the analog camera.

In the exemplary embodiment of FIG. 3, an initial portion of the raw image data may be encoded to form a corresponding I-frame 302 (e.g., I-frame $I_1$). In such an embodiment, I-frame 302 represents a self contained image that, upon decoding by video codec 200, yields an image corresponding to the initial portion of the raw image data.

Subsequent portions of the raw image data may be differentially encoded to yield a corresponding sequence of P-frames 304 (e.g., P-frames $P_2$ $P_3$ $P_4$ . . . $P_{N-1}$ $P_N$) that depend on I-frame 302 and each preceding P-frame in the sequence. For example, as shown in FIG. 3, P-frame $P_2$ represents a difference between the second and the initial portions of raw data, and an image corresponding to the second portion of raw data may be generated based on decoded I-frame 302 and decoded P-frame $P_2$. Similarly, an image corresponding to P-frame $P_7$ may be generated by sequentially decoding I-frame 302 and each of P-frames $P_2$ through $P_7$.

In the embodiments of FIG. 3, P-frames generated by video codec apparatus 200 are associated with a single reference image. The disclosed embodiment are, however, not limited to such exemplary differential encoding schemes, and in additional embodiments, video codec apparatus 200 may generate additional P-frames that are associated with multiple reference images without departing from the spirit or scope of the disclosed embodiments.

Further, in the embodiments described above, the differential coding scheme enables video codec apparatus 200 to generate P-frames that reference previously-encoded image data (i.e., an earlier reference frame). In additional embodiments, video codec 200 may also generate one or more bi-directional predicted frames (i.e., B-frames) that reference both previously-encoded image data (i.e., one or more earlier reference frames) and subsequently-encoded image data (i.e., one or more subsequent reference frames). For example, video codec 200 may generate and position such B-frames between corresponding P-frames to increase latency and reduce future bandwidth requirements for transmitting the encoded video content.

Referring back to FIG. 3, a size associated with an encoded I-frame may be substantially larger than that associated with a corresponding encoded P-frame. For example, I-frame 302 may be fifty kilobytes in size, while each of P-frames 304 may range from one kilobyte to four kilobytes in size, depending on a level of noise associated with the raw image data. In such embodiments, a group-of-pictures (GOP) length associated with the compressed video content may be adjusted to increase a number of P-frames 304 that depend from initial I-frame 302 within sequence 300, thereby decreasing a bit rate necessary to transmit sequence 300 across a communications network (e.g., network 130 of FIG. 1). For example, a bit rate necessary to transmit a sequence having a GOP length of 128 may be two to four times smaller than a bit rate needed to transmit a comparable sequence having a GOP length of thirty-two.

As described above, video codec 200 may transmit compressed video content across network 130 to a recipient device for live viewing or storage, while simultaneously buffering a portion of the compressed video content in a local storage unit (e.g., storage unit 280). In such embodiments, video codec 200 may generate compressed video content having a relatively long GOP length (e.g., 128 frames or longer) in order to reduce a bit rate required to transmit the compressed video content across network 130. However, due to the limited capacity of buffers commonly incorporated within components of IP-based video surveillance systems (e.g., a capacity of 300 kilobytes), the use of such long GOP-length codes may limit an ability of video codec 200 to buffer an entire GOP of compressed video content.

For example, referring back to FIG. 3, video codec apparatus 200 may generate compressed video content having a GOP length of 128 frames. In such an embodiment, I-frame 302 may require fifty kilobytes in storage, while each of the corresponding P-frames 304 may require between one kilobyte to four kilobytes in size. Under such circumstances, an entire GOP of the compressed video content may require between 177 kilobytes (with noiseless frame data) and 558 kilobytes (with noisy frame data) of storage capacity. In such embodiments, video codec 200 may be unable to buffer a complete GOP of compressed video content within a 300 kilobyte buffer, as the initial I-frame of the GOP may be overwritten by subsequent P-frames, and a recipient of the buffered content may be unable to decode the buffered content to generate a corresponding image.

Figure 4:
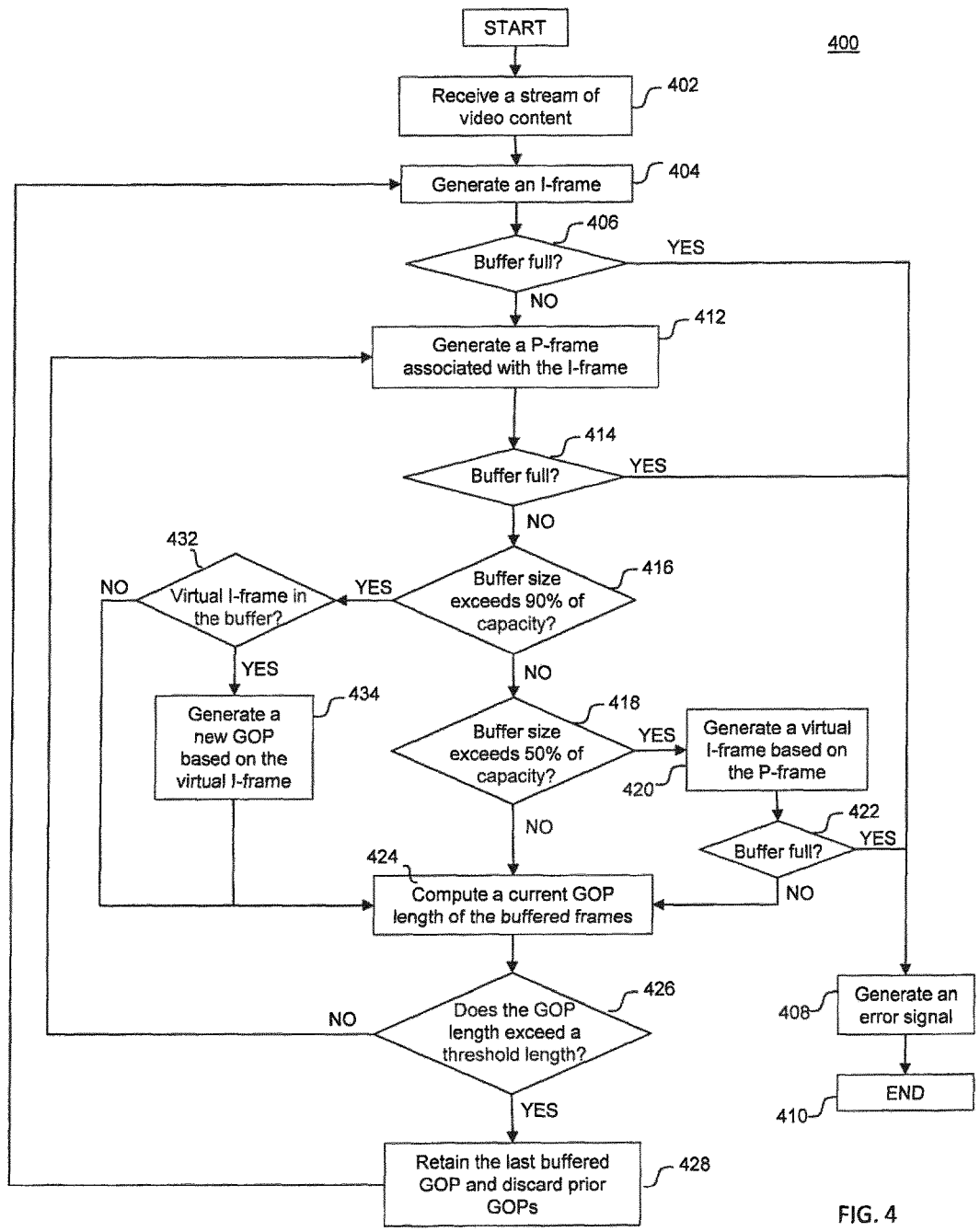
FIG. 4 is a flowchart of an exemplary method to generate and buffer compressed video content, consistent with disclosed embodiments.

FIG. 4 illustrates an exemplary method 400 to generate and buffer compressed video content, in accordance with embodiments of the present disclosure. Method 400 may be implemented by a video codec (e.g., on-chip codec 200) to generate compressed video content having long GOP length codes, and to subsequently buffer the compressed video content within storage units having limited buffer capacity. As will be apparent to one of skill in the art from the present disclosure, the steps and arrangement of the same in FIG. 4 may be modified, as needed. Moreover, the thresholds (e.g., 50% and 90%) described below with reference to method 400 are for purposes of illustration and may be modified, as needed.

In FIG. 4, video codec 200 receives a stream of video content in step 402. In an embodiment, the video content may be captured by an image sensor associated with the networked camera (e.g., a CCD device or a CMOS device), and may be subsequently filtered by a sensor unit (e.g., sensor unit 220 of video codec 200) to generate filtered video content, as described above in reference to the exemplary embodiment of FIG. 2.

In step 404, video codec 200 generates an intra-frame (i.e., an I-frame) based on an initial portion of the received video content stream, and in step 406, video codec 200 determines whether excess capacity exists within a corresponding buffer (e.g., a portion of storage unit 280). In an embodiment, video codec 200 generates the I-frame in step 404 by encoding raw image data in accordance with a differential coding scheme that includes, but is not limited to, the H.264 standard for high definition video and the H.265 standard for high efficiency video coding.

If video codec 200 determines that no excess capacity exists in the buffer (i.e., that the buffer is full), then an error signal is generated in step 408, and method 400 is completed in step 410. If, however, video codec 200 determines that the buffer is not full, then the encoded I-frame is buffered and an additional portion of the received video content stream is encoded by video codec 200 to generate a corresponding inter-frame (i.e., a P-frame) in step 412. In such embodiments, the generated P-frame represents a difference between the initial and additional portions of the received video content stream, as discussed above in reference to FIG. 3.

For example, when generating the P-frame in step 412, the differential encoding schemes described above (e.g., the I-frame encoding scheme of the H.264 standard or the H.265 standard) may mandate that video encoder 200 decode the newly-encoded P-frame to generate a corresponding reference frame. In such an embodiment, video codec 200 may leverage the reference frame to generate a subsequent P-frame, and additionally or alternatively, a virtual I-frame based on the P-frame, as discussed below.

In step 414, video codec 200 again determines whether excess capacity exists in the buffer. If video codec 200 determines that the buffer is full, then the method 400 passes back to step 408, at which time an error signal is generated and the method is complete in step 410.

If, however, video codec 200 determines that excess capacity exists in the buffer, video codec 200 buffers the generated P-frame at a corresponding position within the group of pictures, and then determines in step 416 whether an amount of the buffered data exceeds a threshold portion of the buffer capacity, e.g., 90% of the buffer capacity. In an embodiment, a 90% (or other) threshold indicates to video codec 200 that the buffer is in imminent danger of experiencing overflow (i.e., that a subsequent frame overwrites a previously-buffered frame).

If the buffered data amount fails to exceed 90% of the buffer capacity, then video codec 200 determines in step 418 whether the buffered data amount exceeds an additional threshold portion, e.g., 50% of the buffer capacity. If the buffered data amount exceeds 50% (or other) of the buffer capacity, the codec generates, in step 420, a virtual I-frame based on the previously-buffered P-frame.

To generate the virtual I-frame in step 420, video codec 200 may first identify the final P-frame in the sequence of compressed data stored within the buffer. In an embodiment, the identified P-frame corresponds to the P-frame previously generated in step 412, and video codec 200 may leverage reference data associated with the identified P-frame to generate the corresponding virtual I-frame in step 420, which may be stored with the corresponding P-frame data in the buffer.

For example, to generate the virtual I-frame, video codec 200 may encode the reference data using a corresponding I-frame algorithm (e.g., the I-frame algorithm of the H.264 standard or the H.265 standard) with a modified set of encoding parameters. In such embodiments, the parameters used to encode the virtual I-frame, e.g., a quality parameter, may be different from those used to encode P-frames or other I-frames, and the modified parameters may result in a virtual I-frame having a quantization level lower or higher than quantization levels associated with the P-frames and I-frames. Further, in additional embodiments, the quality parameter of the virtual I-frame may be tuned to reduce and/or minimize the quantization error associated with the virtual I-frame generated in step 420.

For example, FIG. 5A illustrates an exemplary buffered frame sequence 500, in accordance with the disclosed embodiments. As described above, video codec 200 may determine that buffered frame sequence 500 exceeds 50% of the buffer capacity after storing a final P-frame 504, e.g., P-frame $P_8$. In such an embodiment, video codec 200 may then generate a virtual I-frame 506 corresponding to P-frame $P_8$ by re-encoding reference frame data associated with P-frame $P_8$ using a corresponding I-frame algorithm (e.g., the I-frame algorithm of the H.264 standard or the H.265 standard). As described above, video codec 200 may modify freely one or more parameters of the I-frame algorithm (e.g., a quality parameter) to reduce quantization errors associated with the generated virtual I-frame, $V_8$, which may subsequently stored in the buffer with the corresponding P-frame $P_8$ and the initial I-frame $I_1$.

The disclosed embodiments are, however, not limited to techniques that generate virtual I-frames based on corresponding reference data. In additional embodiments, video codec 200 may generate a decoded image corresponding to the raw image data of P-frame $P_8$ by decoding an initial I-frame 502 of the buffered sequence (e.g., I-frame $I_1$) and a succession of P-frames $P_2$ through $P_8$. Video codec 200 may then generate virtual I-frame 506 by re-encoding the decoded image data using the corresponding I-frame algorithm, as described above.

Referring back to FIG. 4, and subsequent to storing the generated virtual I-frame in the buffer, video codec 200 may perform an additional check on the excess capacity of the buffer in step 422. If video codec 200 may determines that the buffer is full in step 422, then method 400 passes back to step 408, which generates an error signal, and the method is complete in step 410.

Alternatively, if video codec 200 determines that excess capacity exists in the buffer, then video codec 200 may compute a length of the current buffered group of pictures (GOP) in step 424, and may compare the computed length against a threshold length in step 426. In an embodiment, the threshold length may represent a GOP length associated with video codec 200, and may be tuned to generate a bit rate acceptable for a transmission of the compressed video content across a communications network (e.g., communications network 130 of FIG. 1).

If video codec 200 determines in step 426 that the length of the current buffered GOP exceeds the threshold length, then the current buffered GOP represents a complete group of encoded frames (i.e., a complete GOP as defined by video codec 200). Video codec 200 may then generate an instruction in step 428 (e.g., using processing unit 260) to retain the current buffered GOP and discard any previously-encoded GOPs from the buffer. For example, as depicted in FIG. 5B, when a length of a current buffered GOP 510 exceeds the GOP length of video codec 200, the buffer includes both current buffered GOP 510, which is complete, and a prior complete GOP 508. In such an embodiment, the completed GOP 508 and any corresponding virtual I-frames are discarded in step 428, and frames 510 are left in the buffer. The exemplary method of FIG. 4 passes back to step 404, and the codec generates an additional I-frame based on the received video content stream.

Referring back to step 426, if the length of the current buffered GOP fails to exceed the threshold length, then the buffer includes an I-frame associated with an incomplete group of encoded frames. In such an embodiment, method 400 passes back to step 412, and the codec generates an additional P-frame associated with the previously-buffered I-frame.

Referring back to step 418, if video codec 200 determines that the buffered data amount fails to exceed 50% of the buffer capacity, then video codec 200 may determine that the buffer is not danger of overflow. In such an embodiment, method 400 passes directly to step 424, and video codec 200 computes a GOP length associated with the buffered frames, as described above.

Referring back to step 416, if video codec 200 determines that the buffered data amount exceeds 90% of the buffer capacity, then the buffer may be in imminent danger of overflow. In such an embodiment, video codec 200 may subsequently determine in step 432 whether the buffered frames include a virtual I-frame. If the buffered frames include a virtual I-frame, then video codec 200 generates a new GOP based on the virtual I-frame in step 434. The coded may then discard the frames buffered prior to the virtual I-frame, as well as the P-frame that corresponds to the virtual I-frame, as described below with reference to FIG. 5C, for example.

Figure 5C:
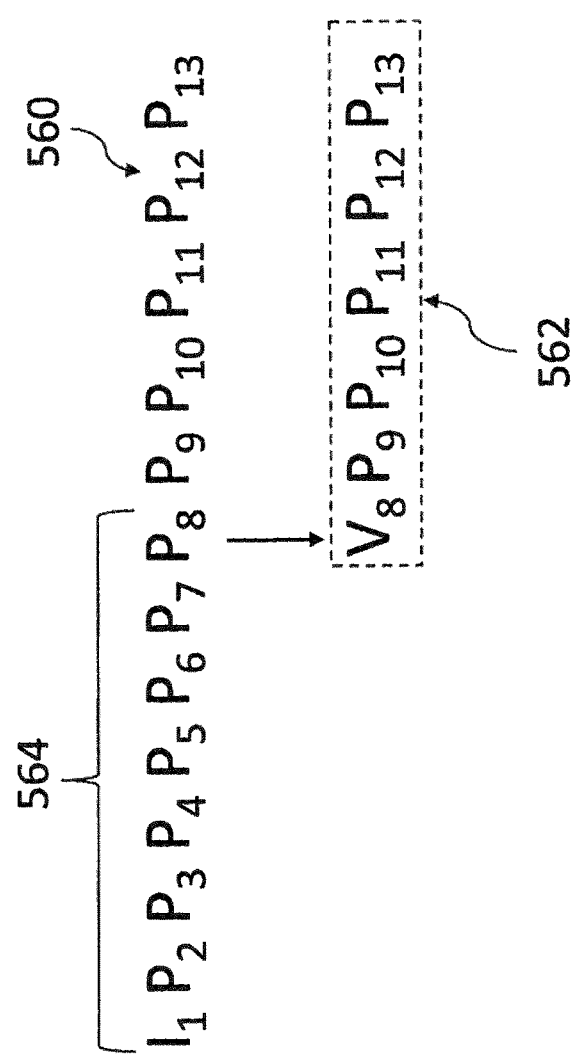

For example, as depicted in FIG. 5C, video codec 200 may determine in step 416 that buffered frames 560 exceeds 90% of the buffer capacity, and further, may determine in step 432 that the buffer includes a virtual I-frame, i.e., virtual I-frame $V_8$. Video codec 200 may then generate a new GOP 562 based on virtual I-frame $V_8$, and may subsequently discard the frames 564 buffered prior to $V_8$, including P-frame $P_8$ from which $V_8$ is derived.

Referring back to FIG. 4, upon generation of the new GOP in step 434, method 400 passes back to step 424, and video codec 200 computes a GOP length corresponding to the new GOP, as described above. Similarly, if video codec 200 determines in step 432 that the buffer fails to include a virtual I-frame, then method 400 also passes back to step 424, and video codec 200 computes a GOP length associated with the currently-buffered frames.

In the embodiments described above, exemplary method 400 may be optimized to enable a video codec (e.g., video codec 200) to buffer a single, completed GOP of compressed video content. The disclosed embodiments are not limited to such optimized techniques, and in additional embodiments (not depicted in FIG. 4), the exemplary methods of FIG. 4 may be modified to enable video codec 200 to store a plurality of complete GOPs compressed video content within the corresponding buffer, and additionally or alternately, one or more pre-determined or adaptively-determined portions of a complete GOP of compressed video content, without departing from the spirit of scope of the disclosed embodiments.

Further, in additional embodiments, the exemplary techniques of FIG. 4 may be combined with one or more error handling functionalities and with one or more transmission functionalities to deliver compressed video content to a recipient (e.g., client device 112 or data repository 124) over a communications network (e.g., network 130). For example, transmission functionalities consistent with the disclosed embodiments may enable video codec 200 to identify a GOP of compressed video content for transmission, to initiate transmission of portions of the identified GOP, and to "lock" the identified GOP within the buffer until completion of the transmission process. In such embodiments, the video codec 200 may be unable to delete or overwrite the identified GOP of compressed video content until after the transmission process is successfully completed.

As described above, the buffered video content may include groups of videos having I-frames, one or more corresponding P-frames, and additionally or alternatively, one or more bi-directional predicted frames (i.e., B-frames) that reference both an earlier reference frame and a subsequent reference frame. For example, the B-frames may be inserted by video codec 200 between pairs of P-frames of the GOP (e.g., in a sequence IBBPBBPBBP . . . ).

Although not depicted in FIG. 4, exemplary methods consistent with the disclosed embodiments may generate virtual I-frames based not only on reference data associated with P-frames, but also on reference data associated with B-frames. For example, the techniques for generating a virtual I-frame based on a corresponding B-frame may modify a transmit order of the encoded video content, and may further correct frame data disposed at temporal positions subsequent to the B-frame to account for the conversion. In such embodiments, the generation of the virtual I-frame based on the B-frame may create an independently-decodable starting point, or IDR-frame (instantaneous decoder refresh frame), within the buffered video content.

Using the processes described above, video codec 200 may support both large GOP-length encoding of video data in accordance with the H.264 or H.265 standard and the buffering of encoded frame data within a network camera (e.g., network camera 102 of FIG. 1) having limited buffer memory. In such embodiments, the exemplary processes of FIG. 4 may enable video codec 200 to provide to a recipient, in response to a triggering incident, not only encoded video content captured subsequent to the event, but also buffered video content that provides the recipient with video captured immediate prior to the incident.

For example, the triggering incident may include, but is not limited to, a request for video content transmitted by the recipient (e.g., client device 112) across network 130. In such embodiments, a user of client device 112 may be viewing streamed video content captured by a network camera (e.g., network camera 102), and in response to an incident occurring within the streamed content, may request delivery of video content captured immediate before and after the incident. The user may, in such instances, access a web page or other graphical user interface associated with network camera 102 to request the delivery of the video content and, additional or alternately, designate a recipient of the content. Further, in such embodiments, the user may also obtain the video content captured immediate before and after the incident from a storage device incorporated with the network camera or video decoder box, e.g., a SD card or flash memory device.

The disclosed embodiments are not limited to requests initiated by users of networked devices, and in additional embodiments, video codec 200 may include functionality (e.g., one or more software applications executed by CPU 262) that enables video codec 200 to identify a triggering incident within a portion of captured raw image data. For example, such triggering incidents may include, but are not limited to, a specific individual appearing within the portion of the raw image data, a particular act occurring within the raw image data, motion within the rate image data after a period of calm, or any additional or alternate event capable of being detected by a functionality of video codec 200. Further, in such embodiments, the user of client device 112 may access a web page or other graphical user interface associated with video codec 200 (e.g., as included within network camera 102) to specify one or more triggering events for detection by video codec 200.

Furthermore, in additional embodiments, video codec 200 may detect the triggering incident based on signals generated by one or more external sensors. For example, video codec 200 may be in communication with one more sensors, including, but not limited to, a thermal sensor, a motion sensor, a radiation sensor, an acoustic sensor, a door or relay contact sensor, and an infrared sensor, to detect one or more triggering events based on conditions surrounding video codec 200 (e.g., surrounding network camera 102 that incorporates video codec 200). In such embodiments, the sensors may be in communication with video codec 200 across communications network 130, or alternatively, through a wired or wireless connection using one or more interfaces (e.g., interfaces 246, 268, 250, and 252). Upon detection of the triggering incident, the video codec may generate an instruction to transmit a portion of the buffered data to a designated recipient, as described below with reference to FIG. 6, for example.

Figure 6:
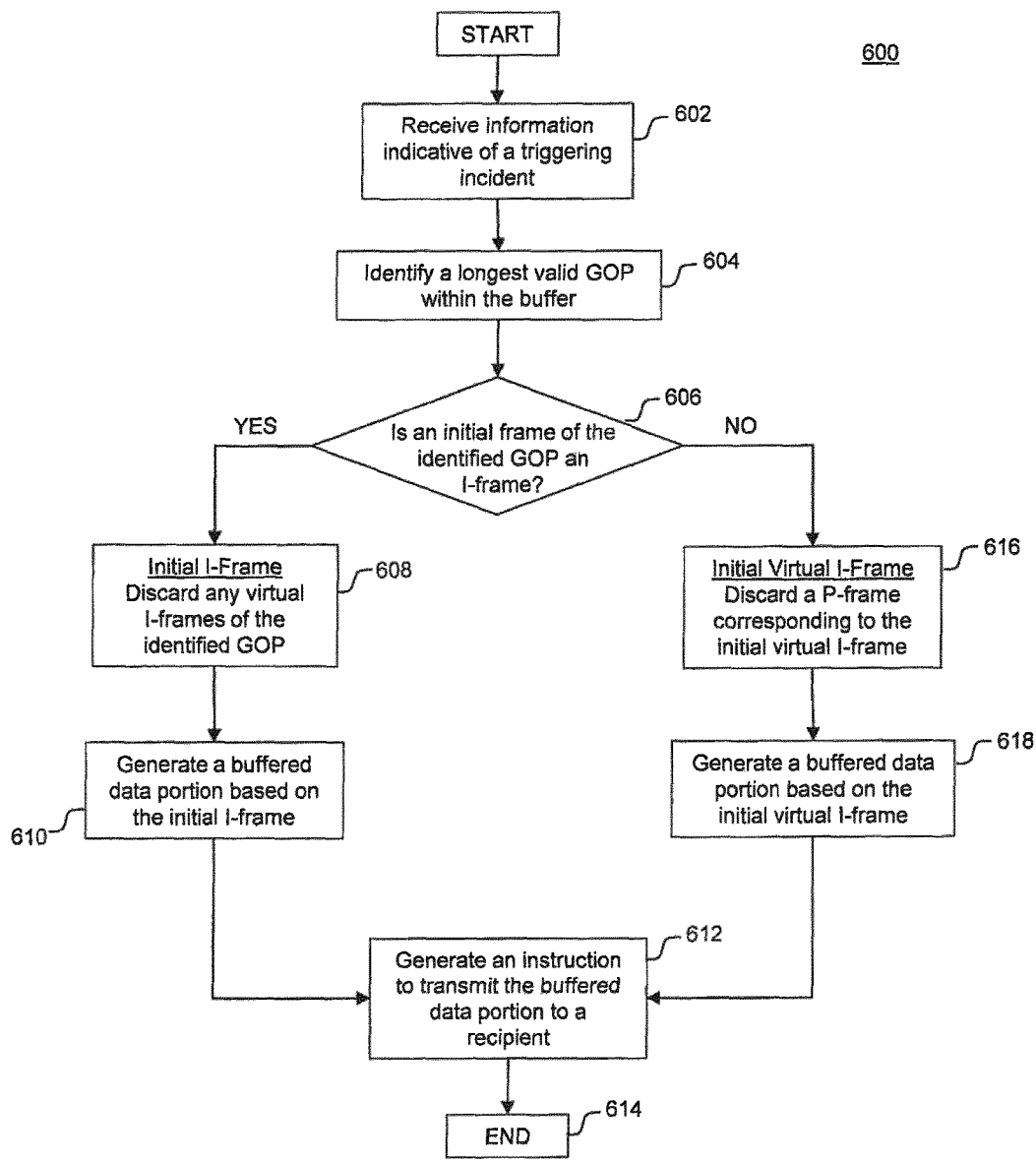
FIG. 6 is a flowchart of an exemplary method for transmitting buffered video content in response to a triggering incident, consistent with disclosed embodiments.

FIG. 6 illustrates an exemplary method 600 for transmitting buffered video content in response to a triggering incident, consistent with disclosed embodiments. Method 600 may provide functionality that enables a video codec (e.g., on-chip video codec 200) to identify a triggering incident and subsequently generate a portion of buffered data for transmission to a recipient.

In step 602, video codec 200 may receive information indicative of a triggering incident. In an embodiment, and as described above, the triggering incident information may include, but is not limited to, a request for compressed video content from a user of a client device (e.g., client device 112), an occurrence of a predetermined event within raw image data received by video codec 200, a receipt of a predetermined type of raw image data, or a detection of a predetermined event by a sensor or networked device in communication with video codec 200.

Further, as discussed above, the triggering incident information may be received by an interface of video codec 200 (e.g., one or more of interfaces 246, 248, 250, and 252) from a client device, sensing device, a relay or door contact sensor, an alarm transmitted by an additional network device, or any additional or alternate device appropriate to video codec 200 and in communications with video codec 200 across communications network 130. In such embodiments, the user of client device 112 may access video codec 200 using a web page or an appropriate graphical user interface, and may establish one or more triggering incidents that will result in a transmission of compressed video content by video codec 200.

Referring back to FIG. 6, and upon receipt of the triggering incident information, video codec 200 may access buffered frame data (e.g., within storage device 280) to identify in step 604 a longest valid sequence of frames currently stored within the buffer. For example, in step 604, video codec 200 may identify a sequence associated with the earliest-encoded I-frame within the buffer as the longest valid sequence, or in the absence of buffered I-frames, the longest valid sequence identified in step 604 may correspond to a sequence associated with the earliest-generated virtual I-frame.

In step 606, video codec 200 determines whether an initial encoded frame of the identified sequence in step 604 is an I-frame or a virtual I-frame. If the initial encoded frame corresponds to an I-frame, then video codec 200 may discard any virtual I-frame data in the identified sequence in step 608 while maintaining the corresponding P-frame data.

In step 610, video codec 200 may generate a group of pictures (GOP) for the buffered sequence that includes at least the I-frame for subsequent transmission, and in step 612, video codec 200 generates an instruction to transmit the buffered GOP to a designated recipient. In an embodiment, a user of a client device (e.g., one of client devices 112 and 114) may establish a communications session with video codec 200 across network 130, and may access web page of an appropriate graphical user interface to specify the designated recipient. For example, the designated recipient may include, but is not limited to, one of client devices 112 and 114, video management system 120, and any additional or alternate device accessible to the user and in communication with video codec 200 across network 130. Method 600 is subsequently completed in step 614.

If, however, the initial encoded frame of the identified sequence corresponds to a virtual I-frame in step 606, then a portion of the buffered data corresponding to the I-frame may have been overwritten. In such an embodiment, video codec 200 discards the P-frame data associated with the initial virtual I-frame (and additionally, any subsequent virtual I-frame data within the identified sequence) in step 616, and generates a GOP in step 618 based on the initial virtual I-frame, as outlined above in reference to FIG. 5C.

Method 600 passes back to step 612, and video codec 202 generates an instruction to transmit the buffered GOP to the designated recipient. The method is subsequently completed in step 614.

In the embodiments described above, video codec 200 may buffer video content encoded at a group-of-pictures (GOP) length suitable for streaming delivery across communications network 130 (e.g., a GOP length of 128 frames) and may subsequently deliver a portion of that buffered video content to a designated recipient in response to a predetermined triggering incident. For example, as described above, a complete, valid sequence of buffered video content may include an initial I-frame (or initial virtual I-frame), one or more virtual I-frames, and one or more corresponding P-frames. Using the embodiments of FIG. 6, the virtual I-frame data subsequent to the initial I-frame (or the virtual I-frame) may be discarded prior to transmission in favor of the corresponding P-frames. In such embodiments, the transmission bit rate of the resulting sequence of buffered video content may be reduced to a level acceptable to recipients operating within communications network 130 (e.g., client devices 112 and 114).

Furthermore, in such embodiments, video codec 200 may also transmit the encoded video content across network 130 to a recipient device for live viewing and/or continuous recording either continuously, at specified intervals, or in response to the triggering incident. For example, video codec 200 may transmit the encoded video content to a data repository in communication network 130 (e.g., data repository 124) for storage and subsequent retrieved by users of the IP-based surveillance network (e.g., users of client devices 112 and 114).

However, while the GOP length of the encoded video content may reduce a bit rate necessary to transmit the encoded video content across communication network 130, the subsequent storage of the encoded video content at such a GOP length may render subsequent access inconvenient to a user. For example, using a long GOP length suitable for transmission across network 130 (e.g., 128 frames) may limit an ability of the user to randomly access portions of the stored video content and to browse or skip throughout the content. In such embodiments, the GOP length of the encoded video content may tuned in accordance with requirements of a designated recipient or a user of the designated recipient prior to storage, as described below with reference FIG. 7, for example.

Figure 7:
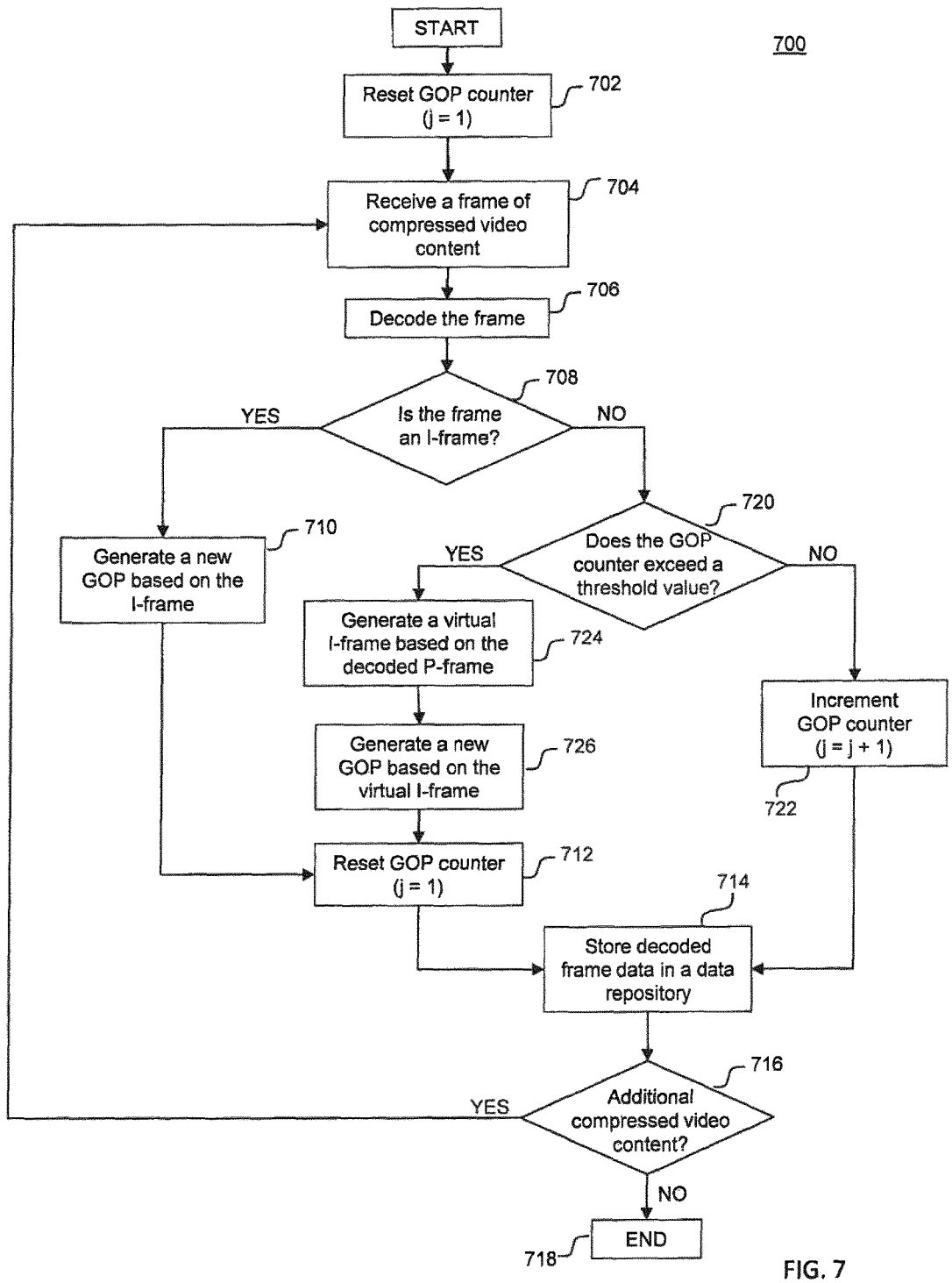
FIG. 7 is a flowchart of an exemplary method for modifying a group-of-picture (GOP) length of encoded video content, consistent with disclosed embodiments.

FIG. 7 illustrates an exemplary method 700 for modifying a group-of-picture (GOP) length of encoded video content, in accordance with embodiments of the present disclosure. Method 700 may provide functionality that enables a designated recipient of encoded video content (e.g., a data repository 124 of video management system 120) to adaptively modify a GOP length of the encoded video content prior to storage.

In FIG. 7, data repository 124 may reset a GOP counter to unity in step 702, and may subsequently receive a frame of compressed video content in step 704. In such embodiments, the compressed video content may be received from a video codec of a network camera (e.g., on-chip codec 200) over communications network 130, and the encoded video content may be associated with a GOP length tuned in conformance with one or more conditions of network 130. Further, the encoded video content may be generated in accordance with any of a number of appropriate differential coding schemes, including, but not limited to the H.264 standard for high definition video and the H.265 standard for high efficiency video coding, In step 706, the received frame may be decoded in accordance with the corresponding differential coding scheme. Data repository 124 may subsequently determine whether the decoded frame corresponds to an intra-frame (i.e., an I-frame) in step 708.

If the decoded frame corresponds to an I-frame, then data repository 124 may establish a new GOP based on the received I-frame in step 710. The GOP counter may reset to unity in step 712, thereby indicating the establishment of the new GOP, and data repository 124 may store the decoded frame data in step 714.

Upon storage of the decoded frame data in step 714, data repository 124 may determine in step 716 whether additional encoded video content is available for processing. If additional content is available for processing, exemplary method 700 may pass back to step 704, and data repository 124 may obtain an additional frame of encoded video content for processing. If, however, data repository 124 determines that no additional video content is available for processing, then exemplary method 700 is complete in step 718.

Referring back to step 708, if data repository 124 determines that the decoded frame corresponds to an inter-frame (i.e., a P-frame), then the designated recipient may determine in step 720 whether a number of the decoded frames exceeds a threshold value. In such embodiments, the current value of the GOP counter may be indicative of a number of decoded frames that are associated with the current GOP, and the threshold value may be tuned to a maximum GOP length of video content stored in the data repository.

For example, a received video content may be encoded using a GOP length of 128 frames, while the stored video content may be associated with a smaller GOP length (e.g., 32 frames) to enable a user to more effectively browse through the video content upon retrieval. In such embodiments, the threshold value may be a fixed value associated with data repository 124 or a user of data repository 124, or alternatively, the threshold value may be variable in response to user input.

If the number of stored decoded frames fails to exceed the threshold value, then the GOP counter may be incremented by one in step 722. Exemplary method 700 may pass back to step 714, and data repository 124 may store the decoded P-frame in a corresponding position within the GOP, as described above.

However, if data repository 124 determines that the number of stored decoded frames exceeds the threshold value in step 720, the designated recipient may generate a virtual I-frame based on the decoded P-frame in step 724, and may generate a new GOP based on the virtual I-frame in step 726. In such embodiments, outlined above in reference to FIGS. 5A-5C, the generation of the new GOP in step 726 effectively converts the virtual I-frame into a corresponding I-frame for purposes of GOP generation.

Upon generation of the new GOP in step 726, exemplary method 700 passes back to step 712, and the GOP counter is reset to unity. Data repository 124 may subsequently store the virtual I-frame data in step 714 to form the new GOP, and data repository 124 may determine in step 716 whether additional encoded video content is available for processing, as outlined above. Exemplary method 700 is complete in step 718.

In the embodiment described above, data repository 124 of video management system 120 may adaptively modify a GOP length of the encoded video content prior to storage. In such an embodiment, data repository 124 corresponds to a designated recipient of the encoded video content, which may be specified by a user in communications with one or more of network cameras 102 and 104 and video coding unit 116. The disclosed embodiments are not limited to such exemplary recipients, and in additional embodiments, the designated recipients of encoded video content may include, but are not limited to one or more of client devices 112 and 114, video management server 122, which may coordinate with data repository 124, and any additional or alternate device capable of communicating over network 130 to receive encoded video content.

Using the processes described above, a video codec (e.g., on-chip codec 200) may generate and leverage virtual I-frames, to buffer video content encoded within long GOP lengths within devices of limited storage capacity. Further, a similar video codec operative at a designated recipient of encoded video content (e.g., data repository 124) may generate and leverage such virtual I-frames to adaptively tune a GOP length of the encoded video content prior to storage. In such embodiments, the generation and use of virtual I-frames by video codecs disposed at an encoder (e.g., network camera 102) and a decoder (e.g., data repository 124 or client devices 112 and 114) enable a GOP length that results in an acceptable bit rate for transmission of encoded video content a communications network (e.g., network 130 of FIG. 1).

The disclosed embodiments are, however, not limited to such a static transmission bit rate. Video codecs consistent with the disclosed embodiments may encode identical video content at a plurality of transmission bit rates (e.g., three bit rates), which may be stored in an external data repository for subsequent transmission to a client device. In such embodiments, the client device may be configured, through a graphical user interface or programmatically in response to changing network conditions, to request delivery of the encoded video content at various bit rates.

The ability of the client device to request a modification to the transmission bit rate of the encoded video content may, however, be limited by the GOP lengths associated with the various transmission bit streams. For example, encoded video content with a lower bit rate may be associated with a longer GOP length, and as such, a longer interval between consecutive I-frames, than a corresponding portion of the video content encoded at a higher transmission bit rate. In such embodiments, the disparity in GOP length may limit the ability of the client device to switch seamlessly between video content encoded at various transmission bit rates.

In an additional embodiment, the video codec may generate virtual I-frames at various temporal positions of a stream of encoded content to establish "switching points" that enable a recipient device to modify a bit rate during transmission of the encoded video content. For example, and as discussed above, the video codec may include functionality to encode video content at three bit rates (e.g., "Low," "Medium," and "High") to generate three channels of encoded video content. In such an embodiment, the channels of encoded video content may be stored within a data repository (e.g., data repository 124 of video management system 120), and virtual I-frames may be generated at various temporal positions of the stored video content to establish the switching points, as described below with reference to FIG. 8, for example.

Figure 8:
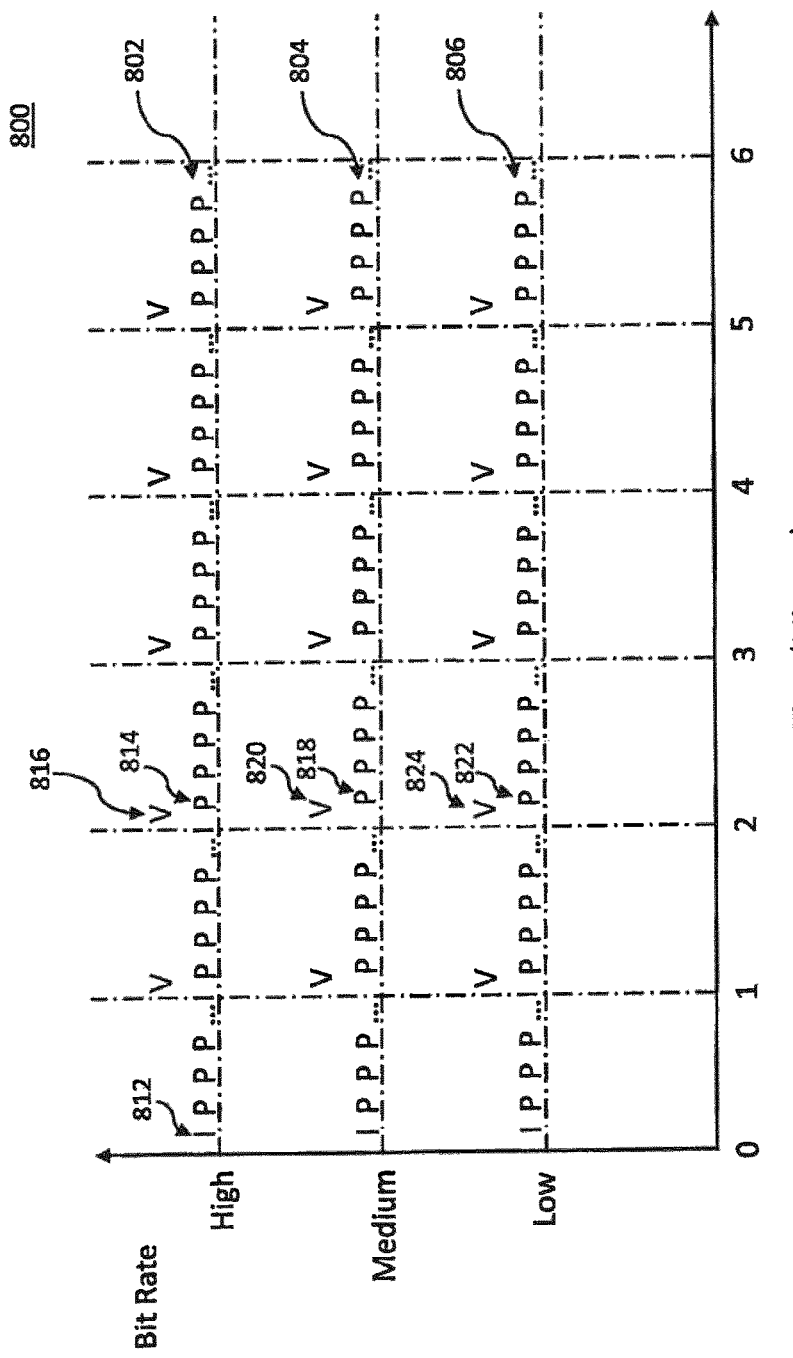
FIG. 8 illustrates an exemplary data structure for storing multiple channels of encoded video content, consistent with disclosed embodiments.

FIG. 8 illustrates an exemplary data structure 800 of three channels of compressed video data having a plurality of switching points, in accordance with embodiments of the present disclosure. In FIG. 8, data structure 800 illustrates three channels of compressed video content encoded at three corresponding bit rates. For example, channel 802 corresponds to stored video content encoded at a "High" bit rate, channel 804 corresponds to stored video content encoded at a "Medium" bit rate, and channel 806 corresponds to stored video content encoded at a "Low" bit rate. The disclosed embodiments are, however, not limited to such exemplary bit rates, and in additional embodiments, data structure 800 may include any additional or alternate number of video content channels encoded at any additional or alternate bit rate apparent to one of skill in the art and appropriate to devices of communications network 130.

In FIG. 8, data structure 800 illustrates a portion of a group of pictures (GOP) for the encoded video content of channels 802, 804, and 806. Further, as discussed above, switching points are established within each of channels 802, 804, and 806 at arbitrary and fixed temporal positions throughout the stored video content. For example, in the embodiment of FIG. 8, a switching point is established at each minute of the encoded video content of each channel. However, the disclosed embodiments are not limited to switching points disposed at such regular temporal intervals, and in additional embodiments, switching points may be established at any additional temporal position within the stored video content without departing from the spirit or scope of the disclosed embodiments.

In an embodiment, a video codec (e.g., on-chip video codec 200 of FIG. 2) may establish a switching point at a corresponding temporal position of the stored video content by generating and storing a virtual I-frame at the temporal position. For example, at a time equivalent to two minutes, video codec 200 may generate a switching point for channel 802 by decoding an initial I-frame 812 and successive P-frames through P-frame 814 to generate a decoded image corresponding to the raw image data of P-frame 814. The video codec then generates a virtual I-frame 816 corresponding to P-frame 814 by re-encoding the decoded image using a corresponding I-frame algorithm (e.g., the I-frame encoding scheme of the H.264 standard or the H.265 standard). Virtual I-frame 816 may then be stored within channel 802 in the data repository.

The disclosed embodiments are, however, not limited to such exemplary techniques for virtual I-frame generation. For example, one or more of the differential encoding schemes described above (e.g., the I-frame algorithm of the H.264 standard or the H.265 standard) may mandate that video encoder 200 decode a newly-encoded P-frame to generate a corresponding reference frame. In such an embodiment, upon encoding P-frame 814, video codec 200 may generate the switching point by directly re-encoding the reference data of P-frame 814 using the corresponding I-frame algorithm to generate virtual I-frame 816, which may be stored within channel 802 in the data repository.

In a similar manner, the video codec may establish a corresponding switching point within channel 804 by generating and storing a virtual I-frame 820 based on a decoded image associated with P-frame 818, and may establish a corresponding switching point within channel 806 by generating and storing a virtual I-frame 824 based on a decoded image associated with P-frame 822. Further, video codec 200 may generate switching points at any additional or alternate temporal position within the compressed video content of channels 802, 804, and 806 (e.g., at one minute, three minutes, etc.) by generating and storing a virtual I-frame corresponding to the temporal position.

In an embodiment, the channels of encoded video content (e.g., channels 802, 804, and 806) be stored within a data repository associated with a web server (e.g., data repository 124 and video management server 122) that provides a client device (e.g., client devices 112 and 114) with access to streaming content at one or more of the bit rates. For example, client device 112 may establish a connection with video management server 122 across a communications network (e.g., communications network 130) using one or more of the communications protocols outlined above.

In such embodiments, video management server 122 may provide, to client device 112, information identifying one or more channels of video content available for streaming download across the established connection. For example, the provided information may include, but is not limited to, a play list of available video and audio content, a number of different bit rate channels, a bit rate for each channel, a duration associated with the content (e.g., a fixed duration or an infinite duration), encryption information, information identifying a codec, and a distance between switching points (e.g., a number of frames or a temporal time). Further, in an embodiment, updates to the content playlist may be provided to client device 112 at regular intervals, upon expiration of a particular element of video content, or at any additional or alternate interval apparent to one of skill in the art and appropriate to client device 112 and video management server 122.

Upon receipt of the provided information, client device 112 may execute a web browser or other appropriate application to render the provided information for display to a user of client device 112. In such embodiments, the user of client device 112 may click, enter a series of keystrokes, or otherwise indicate a selection of one or more of the displayed elements of video content for streaming download. In response to the user's selection, client device 112 may generate a request for the selected video content, which may be transmitted across network 130 to video management server 122.

In an embodiment, the request for the selected media content may include information identifying an initial portion of the video content and an initial bandwidth for transmission of the video content. For example, client device 112 may measure current conditions associated with network 130, and may include information identifying one of the available bit rates of the selected content that is consistent with current network conditions.

Alternatively, the initial request for video content may be associated with a default value of a transmission bit rate, a transmission bit rate that corresponds a functionality of client device 112, a transmission bit rate specified by the user, or any additional or alternate transmission bit rate apparent to one of skill in the art and appropriate to the selected video content and client device. Upon receipt of the request, video management server 122 may transmit an initial portion of the requested video content to client device 112, along with additional information specifying a mechanism by which client device 112 may adaptively adjust a bit rate of subsequent portion of the requested video content, as described below with reference for FIG. 9, for example.

Figure 9:
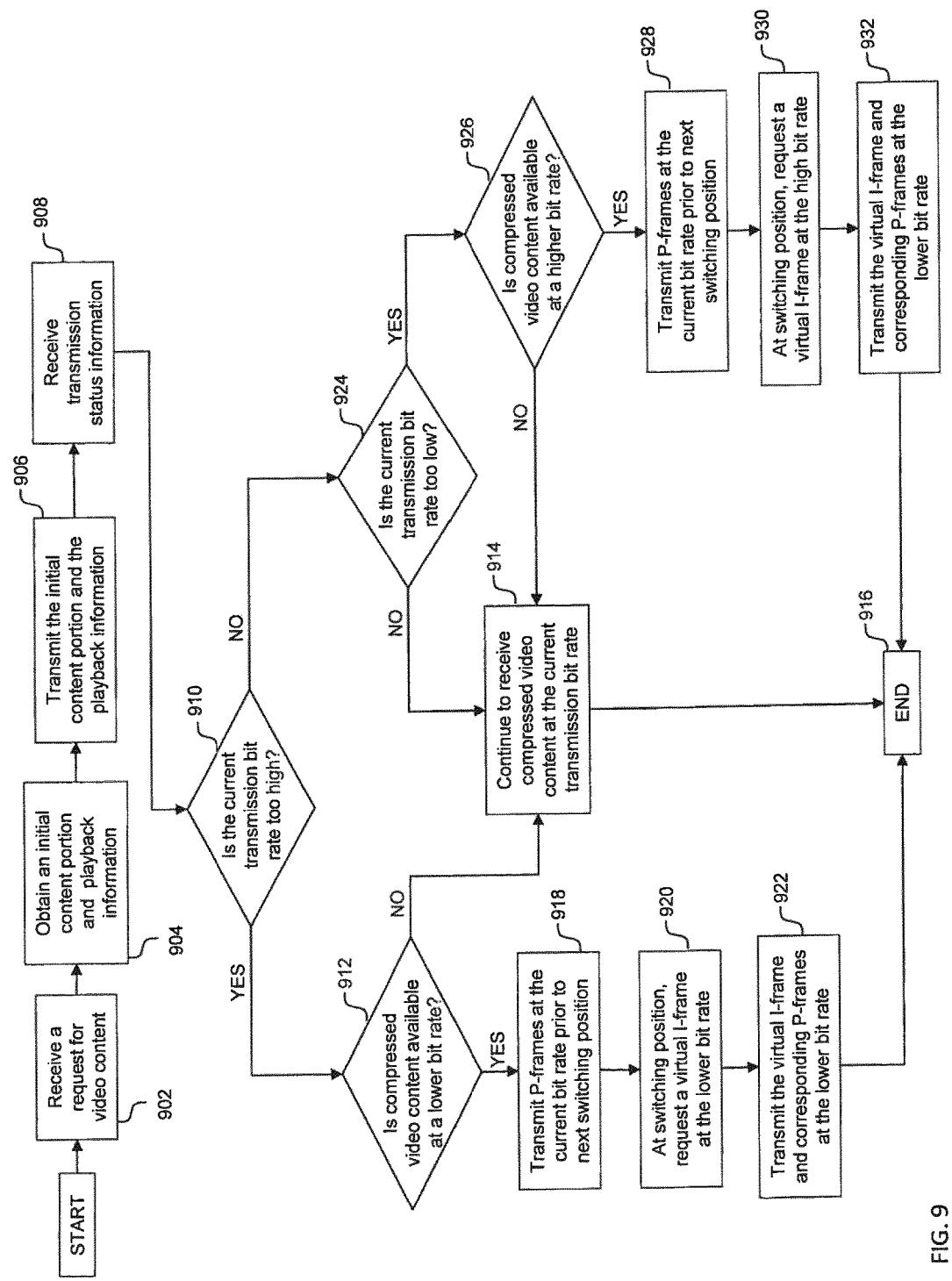
FIG. 9 is a flowchart of an exemplary method for adaptively modifying a bit rate of transmitted video content, consistent with disclosed embodiments.

FIG. 9 illustrates an exemplary 900 for transmitting video content to requesting devices at dynamically-determined transmission bit rates, in accordance with disclosed embodiments. Method 900 may provide functionality that enables a web server (e.g., video management server 122) to modify at transmission bit rate of requested video content using one or more virtual I-frames disposed at corresponding switching points.

In FIG. 9, server 122 may receive, from a client device (e.g., client device 112), a request for a portion of video content in step 902. As discussed above, the request may be transmitted from client device 112 over communications network 130 in accordance with one or more of the communication protocols outlined above (e.g., TCP/IP), and the request may be responsive to information provided by the web server that identifies one or more elements of video content available to client device 112. Further, in such embodiments, the received request may propose a bit rate for transmission of the requested content that, for example, is consistent with conditions of network 130 during transmission of the request by client device 112.

In step 904, server 122 may obtain an initial portion of the requested video content from a data repository (e.g. data repository 124) and may generate information instructing client device 112 on a playback of the initial portion of the requested video content. For example, server 122 may select an initial portion of the video content encoded with a transmission bit rate that matches, or alternatively, falls within the threshold value of the requested transmission bit rate, Further, in an embodiment, the generated information may correspond to a media descriptor for the requested content that identifies one or more switching points for the requested content and one or more additional bitrates available at the switching points.

In step 906, server 122 may transmit the initial portion of the requested video content and the corresponding playback information to client device 112. In an embodiment, the transmission may occur across network 130 in accordance with one or more of the communications protocols outlined above. Additional, in such embodiments, the initial portion of the requested video content and the playback information may be encrypted prior to transmission to client device 112 using any of a number of encryption techniques apparent to one or skill in the art and appropriate to client device 112 and server 122.

Client device 112 may receive the initial portion of the requested content at the corresponding transmission bandwidth. Concurrently with the initial portion, client device 112 may receive the playback information associated with the requested content. As described above, the playback information may include, but is not limited to, information identifying one or more additional bandwidths available for transmission of requested content and information identifying one or more switching points at which client device 112 may switch to a different transmission bit rate. In such embodiments, the playback information and the initial portion of the requested video content may be received on a common communications channel of network 130, or alternatively, the playback information may be transmitted to client device 112 using a dedicated backchannel of network 130.

As described above, client device 112 may monitor conditions of network 120 (e.g., a current bandwidth) during transmission of the initial portion of the requested content. For example, the network conditions may be modified continuously during transmission of the initial portion of the requested content, or alternatively, at discrete intervals during the transmission. Further, in an embodiment, client device 112 may be configured to transmit information identifying the current network conditions to server 122 at regular intervals, or alternatively, in response to a detection of a particular network condition. For example, information identifying a status of network may be transmitted to server 122 when an available bandwidth of network 130 falls below a predetermined threshold.

Server 122 may receive the transmission status information in step 908, and may determine, in step 910, whether a current transmission bit rate associated with the requested video content is too large in view of the current conditions of network 130. If the current transmission is too large for the current network conditions, server 122 may determine whether compressed video content is available at a lower transmission bit rate in step 912. For example, server 122 may access data repository 124 to determine whether data repository 124 stores video content encoded at bit rate smaller than the current bit rate.

If server 122 is unable to locate compressed video content encoded at the lower bit rate in step 912, then server 122 continues to transmit compressed video content to client device 112 at the current transmission bit rate in step 914. For example, in reference to FIG. 8, if the requested video content is transmitted to client device at a "Low" bandwidth of channel 806, then server 122 cannot obtain the requested video content encoded at an even lower bit rate, regardless of the status of network 130. Method 900 is completed in step 916.

Alternatively, if server 122 is able to identify a portion of the requested video content encoded at the lower bit rate, then server 122 may determine to lower the transmission bit rate of the requested content at the next switching point. In such an embodiment, server 122 continues in step 918 to transmit P-frames to client device 112 at the current bit rate until that next switching point.

For example, in reference to FIG. 8, the current transmission bit rate may correspond to the "Medium" bit rate of channel 804, and server 122 may receive the transmission status information at a temporal position between the one and two minute marks. In step 912, server 122 may identify that a portion of the requested video content is available at the "Low" bit rate of channel 806, and in step 918, server 122 may continue to transmit P-frames to client device 112 at the "Medium" bandwidth of channel until the next switching point, e.g., the two-minute mark.

In step 920, server 122 may request a virtual I-frame corresponding to the identified lower bit rate at the next switching point. Upon receipt of the requested virtual I-frame, server 122 may initiate a new group of pictures (GOP) at the identifier lower bit rate, and may then transmit the virtual I-frame and corresponding P-frames to client 102 in step 922. For example, in reference to FIG. 8, server 122 may request virtual I-frame 824 associated with "Low" bit rate channel, and may subsequently transmit virtual I-frame 824 and the corresponding P-frames at the "Low" transmission bandwidth to client device 112. Method 900 is subsequently completed in step 916.

Referring back to step 910, if server 122 determines that the current transmission bit rate of the requested video content is consistent with the current network conditions, server 122 determined in step 924 whether the current network conditions will accommodate a larger transmission bit rate. If the current network conditions will accommodate neither a larger nor a smaller transmission bit rate, then the current transmission bit rate is optimal for the current network conditions, and server 122 continues to transmit the requested video content to client device 112 at the current transmission bit rate in step 914. Method 900 is subsequently completed in step 916.

If, however, server 122 determines that the current network conditions will accommodate a high transmission bit rate in step 924, then server 122 determines a portion of the requested video content is available at a higher transmission bit rate. in step 926. For example, server 122 may access data repository 124 to determine whether data repository 124 stores video content encoded at bit rate larger than the current transmission bit rate.

If server 122 is unable to locate compressed video content encoded at the higher bit rate in step 926, then method 900 passes back to step 914, and server 122 continues to transmit compressed video content to client device 112 at the current transmission bit rate. For example, in reference to FIG. 8, if the requested video content is transmitted to client device at a "High" bandwidth of channel 802, then server 122 cannot obtain the requested video content encoded at an even higher bit rate, regardless of the status of network 130. Method 900 is completed in step 916.

Alternatively, if server 122 is able to identify a portion of the requested video content encoded at the higher bit rate, then server 122 may determine to increase the transmission bit rate of the requested content at the next switching point. In such an embodiment, server 122 continues in step 928 to transmit P-frames to client device 112 at the current bit rate until that next switching point.

For example, in reference to FIG. 8, the current transmission bit rate may correspond to the "Medium" bit rate of channel 804, and server 122 may receive the transmission status information at a temporal position between the one and two minute marks. In step 912, server 122 may identify that a portion of the requested video content is available at the "High" bit rate of channel 802, and in step 928, server 122 may continue to transmit P-frames to client device 112 at the "Medium" bandwidth of channel until the next switching point, e.g., the two-minute mark.

In step 930, server 122 may request a virtual I-frame corresponding to the identified higher bit rate at the next switching point. Upon receipt of the requested virtual I-frame, server 122 may initiate a new group of pictures (GOP) at the identified higher bit rate, and may then transmit the virtual I-frame and corresponding P-frames to client 102 in step 932. For example, in reference to FIG. 8, server 122 may request virtual I-frame 816 associated with "High" bit rate channel, and may subsequently transmit virtual I-frame 816 and the corresponding P-frames at the "High" transmission bandwidth to client device 112. Method 900 is subsequently completed in step 916.

Figure 10A:
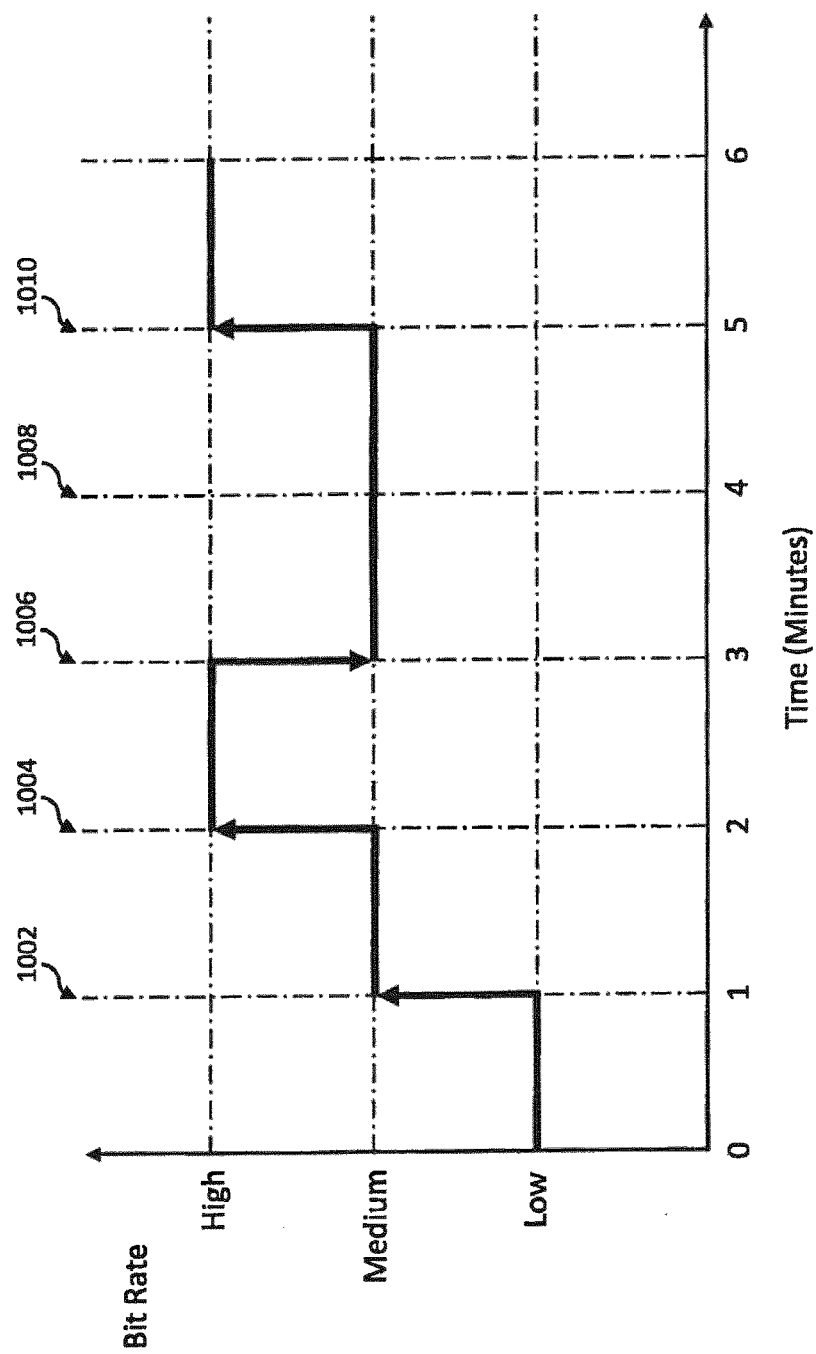

FIGS. 10A and 10B illustrate exemplary adjustments to a transmission bit rate of encoded video content over a period of six minutes, in accordance with disclosed embodiments. For example, in FIG. 10A, server 122 may transmit an initial portion of encoded video content to client device 112 at a transmission bit rate of "Low." Prior to a first switching point 1002 at one minute, server 122 may determine that the current network conditions will accommodate a higher transmission bit rate, and as depicted in FIG. 10B, server 122 requests a virtual I-frame associated the "Medium" bit rate at first switching point 1002. Server 122 continues to transmit P-frames at the "Low" bandwidth until first switching point 1002, and subsequently transmits the virtual I-frame and corresponding P-frames at the "Medium" bit rate to client device 112 after first switching point 1002.

Similarly, prior to a second switch point 1004 at two minutes, server 122 may determine that the current network conditions will accommodate a still higher transmission bit rate, and as depicted in FIG. 10B, server 122 may request a virtual I-frame associated the "High" bit rate. In such an embodiment, server 122 continues to transmit P-frames at the "Medium" bandwidth until second switching point 1004, and subsequently transmits the virtual I-frame and corresponding P-frames at the "High" bit rate to client device 112 after second switching point 1004.

Server 122 may, however, determine that the conditions of network 130 prior to a third switching point 1006 are unable to support the "High" bit rate. In such an embodiment, and as outlined in FIG. 10B, server 122 may request a virtual I-frame associated the "Medium" bit rate at third switching point 1006. Server 122 continues to transmit P-frames at the "High" bandwidth until third switching point 1006, and subsequently transmits the virtual I-frame and corresponding P-frames at the "Medium" bit rate to client device 112 after third switching point 1006.

In the exemplary embodiments of FIGS. 10A and 10B, server 122 may determine that the "Medium" transmission bit rate is optimal for the network conditions at a fourth switch point 1008, and as such, not change in bit rate is imposed. However, at a fifth switching point 1010, server 122 may receive status information indicating that network 130 is able to support a higher transmission bit rate. In such an embodiment, as depicted in FIG. 10B, server 122 may request a virtual I-frame associated the "High" bit rate at fifth switching point 1010. Server 122 may continue transmission of P-frames at the "Medium" bandwidth until second switching point 1006, and may subsequently transmit the virtual I-frame and corresponding P-frames at the "High" bit rate to client device 112 after fifth switching point 1010.

Figure 11A:
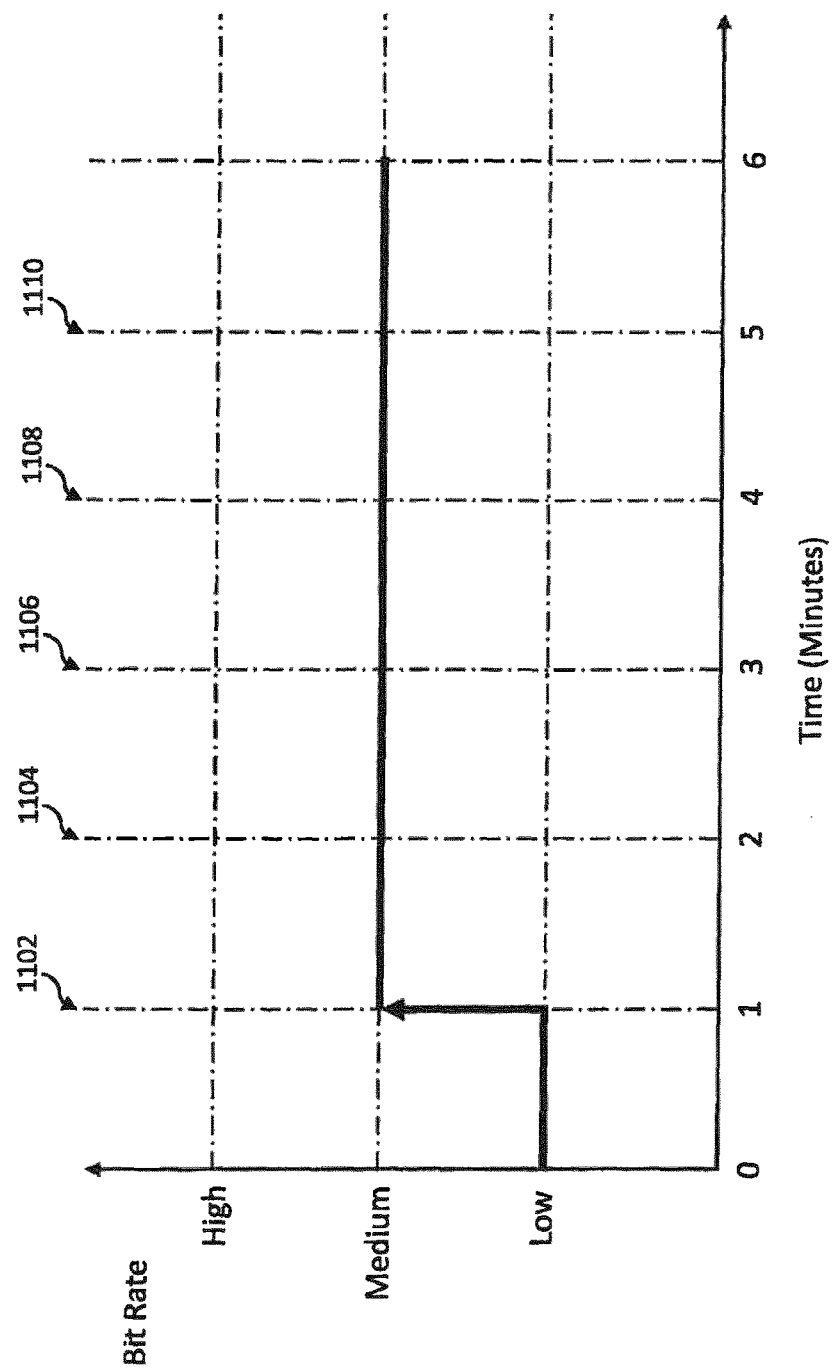

FIGS. 11A and 11B illustrate an additional set of exemplary adjustments to a transmission bit rate of encoded video content over a period of six minutes, in accordance with disclosed embodiments. As described above, server 122 may transmit an initial portion of encoded video content in FIGS. 11A and 11B to client device 112 at a transmission bit rate of "Low." However, prior to a first switching point 1102 at one minute, server 122 may determine that the current network conditions will accommodate a higher transmission bit rate, and as depicted in FIG. 11B, server 122 requests a virtual I-frame associated the "Medium" bit rate at first switching point 1102. Server 122 may continue to transmit P-frames at the "Low" bandwidth until first switching point 1102, and may subsequently transmit the virtual I-frame and corresponding P-frames at the "Medium" bit rate to client device 112 after first switching point 1102.

However, in contrast to the examples of FIGS. 10A and 10B, server 122 determines that the "Medium" transmission bit rate is optimal for the network conditions at each of subsequent switching points 1104, 1106, 1108, and 1110. In such an embodiment, the transmission of P-frames with the current GOP, or an I-frame and subsequent P-frames associated with a subsequent GOP, may continue at the "Medium" bit rate.

In the embodiments described above, client device 112 is configured to measure one or more conditions of a communications network, e.g., communications network 130, during transmission of encoded video content. In such embodiments, information indicative of a current network status may be transmitted to server 122 periodically, or in response to particular network events, as described above.

The disclosed embodiments are, however, not limited to such network measurement techniques. For example, client device 112 may store at least a portion of the encoded video content in a buffer upon receipt and prior to display. In such an embodiment, an amount of data within a storage buffer of client device 112 may be indicative of a current condition of network 130. For example, if the amount of buffered data at client device 112 exceeds a threshold value, a corresponding transmission bit rate may be too large, and information indicative a need to reduce the transmission bit rate may be transmitted to server 122 as status information, as described above.

Furthermore, in the disclosed embodiments, server 122 determines whether to adjust a transmission bit rate of video content based on one or more conditions of a communications network (e.g., communications network 130), which may be transmitted to server 122 by client device 112. The disclosed embodiments are not limited to such adjustment mechanisms, and in additional embodiments, server 122 may adjust the transmission bit rate based on a request from a user of client device 112. For example, the user may access a web page or other graphical user interface associated with server 122, and may transmit from client device 112 an affirmative request to increase or reduce the transmission bit rate. In such embodiments, the modification to the transmission bit rate may be initiated based not on network conditions, but instead on one or more capabilities of client device 112.

In addition, the disclosed embodiments include switching points disposed at fixed temporal positions within stored video content, e.g., switching points 1002, 1004, 1006, 1008, and 1010 disposed at one-minute intervals of FIGS. 10A and 10B. The disclosed embodiments are not limited to such fixed switching points, and in additional embodiments, the temporal positions of such switching points may be determined adaptively by a video codec (e.g., on-chip video codec 200) or by one or more client devices (e.g., client devices 112 and 114) in response to changing network conditions, changing device conditions, or one or more characteristics of the content.

Further, in additional embodiments, one or more of a client device (e.g., client device 112) or a web server (e.g., server 122) may request an additional switching point be generated in advance of a fixed switching point. For example, in reference to FIGS. 10A and 10B, client device 112 may experience a significant degradation in network conditions soon after second switching point 1004. In such an embodiment, a request for an immediate generation of a switching point may be transmitted to server 122, and additionally or alternatively, to a video codec associated with the compressed video content across a backchannel of communications network 130. Upon receipt of the request, the video codec may generate a corresponding I-frame, which may be stored within a data repository associated with server 122 (e.g., repository 124) for transmission to client device 112, or alternatively, may be transmitted directly to client device 112.

Figure 12:
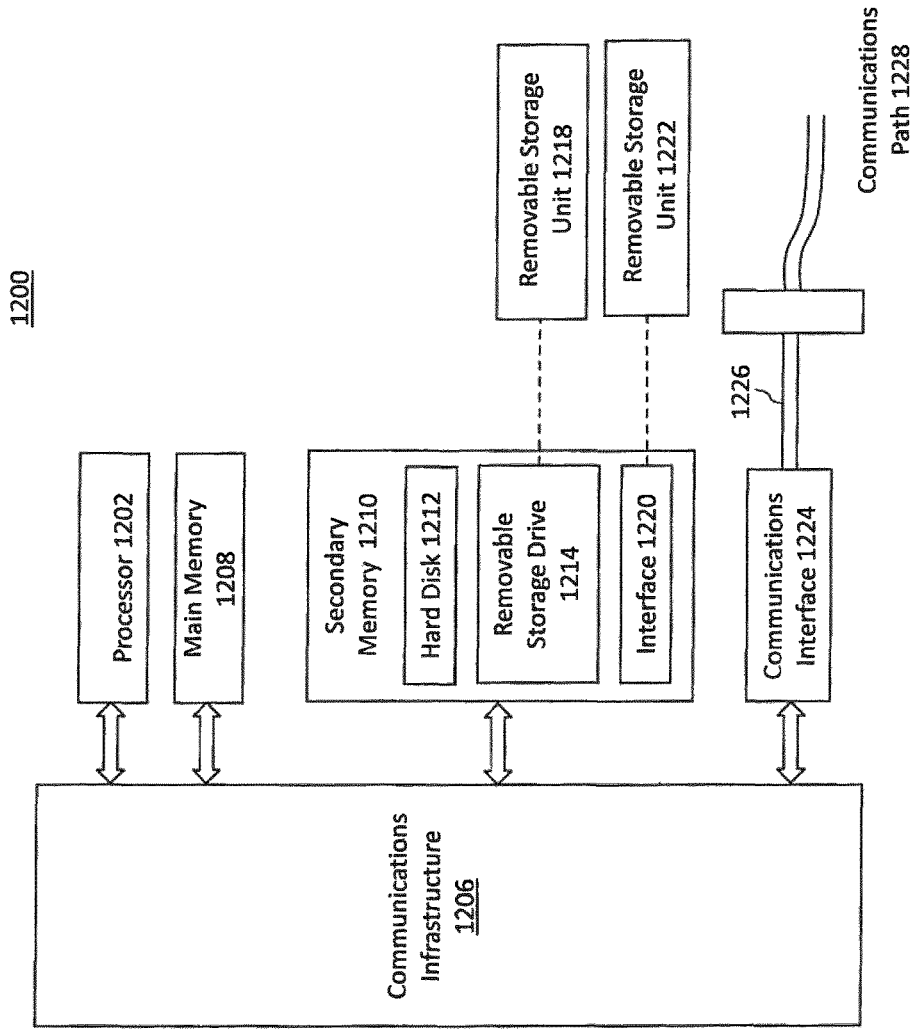
FIG. 12 illustrates an exemplary computer system within which the disclosed embodiments may be practiced.

As described above, client devices 112 and 114, video management server 122, and data repository 124 can be implemented with at least one processor or computer-based system. FIG. 12 illustrates an exemplary computer system 1200, with which embodiments consistent with the present disclosure may be implemented. Computer system 1200 includes one or more processors, such as processor 1202. Processor 1202 is connected to a communication infrastructure 1206, such as a bus or communications network, e.g., network 130 of FIG. 1.

Computer system 1200 also includes a main memory 1208, for example, random access memory (RAM), and may include a secondary memory 1210. Secondary memory 1210 may include, for example, a hard disk drive 1212 and/or a removable storage drive 1214, representing a magnetic tape drive, an optical disk drive, CD/DVD drive, etc. The removable storage drive 1214 reads from and/or writes to a removable storage unit 1218 in a well-known manner. Removable storage unit 1218 represents a magnetic tape, optical disk, or other storage medium that is read by and written to by removable storage drive 1214. As will be appreciated, the removable storage unit 1218 can represent a computer readable medium having stored therein computer programs, sets of instructions, code, or data to be executed by processor 1202.

In alternate embodiments, secondary memory 1210 may include other means for allowing computer programs or sets of instructions to be loaded into computer system 1200. Such means may include, for example, a removable storage unit 1222 and an interface 1220. An example of such means may include a removable memory chip (e.g., EPROM, RAM, ROM, DRAM, EEPROM, flash memory devices, or other volatile or non-volatile memory devices) and associated socket, or other removable storage units 1222 and interfaces 1220, which allow instructions and data to be transferred from the removable storage unit 1222 to computer system 1200.

Computer system 1200 may also include one or more communications interfaces, such as communications interface 1224. Communications interface 1224 allows computer programs (or sets of instructions) and data to be transferred between computer system 1200 and external devices. Examples of communications interface 1224 may include a modem, a network interface (e.g., an Ethernet card), a communications port, a PCMCIA slot and card, etc. Computer programs (or sets of instructions) and data may be transferred via communications interface 1224 in the form of signals 226, which may be electronic, electromagnetic, optical or other signals capable of being received by communications interface 1224. These signals 1226 are provided to communications interface 1224 via a communications path (e.g., channel 1228). Channel 1228 carries signals 1226 and may be implemented using wire, cable, fiber optics, RF link, and/or other communications channels. In an embodiment of the invention, signals 1226 comprise data packets sent to processor 1202. Information representing processed packets can also be sent in the form of signals 1226 from processor 202 through communications path 1228.

Further, although not depicted in FIG. 12, one or more of client devices 112 and 114, video management server 122, and data repository 124 may also include a hardware or software based video codec capable of decoding video content provided by network cameras 102 and 104 and video coding unit 116. For example, client devices 112 and 114, video management server 122, and data repository 124 may include a hardware-based codec unit consistent with on-chip video codec 200, as described above, to decode and manipulate video content encoded in accordance with the H.264 standard for high definition video.

The terms "storage device" and "storage medium" may refer to particular devices including, but not limited to, main memory 1208, secondary memory 1210, a hard disk installed in hard disk drive 1212, and removable storage units 1218 and 1222. Further, the term "computer readable medium" may refer to devices including, but not limited to, a hard disk installed in hard disk drive 1212, any combination of main memory 1208 and secondary memory 1210, and removable storage units 1218 and 1222, which respectively provide computer programs and/or sets of instructions to processor 1202 of computer system 1200. The term "computer readable medium" may also refer a storage unit, e.g., storage unit 280, in communications with a processor 242 and corresponding cache 244 of on-chip video codec 200, and that provides computer programs and/or sets of instructions to the processor of codec 200. Such computer programs and sets of instructions can be stored within one or more computer readable media. Additionally or alternatively, computer programs and sets of instructions may also be received via communications interface 1224 and stored on the one or more computer readable media.

Such computer programs and instructions, when executed by processor 1202, enable processor 1202 to perform the computer-implemented methods described herein. Similarly, when executed by processor 242, such computer programs and instructions also enable processor 242 to perform the computer-implemented methods described herein. Examples of program and sets of instructions include, for example, machine code, such as code produced by a compiler, and files containing a high-level code that can be executed by processors 1202 and 242 using an interpreter.

Furthermore, the computer-implemented methods described herein can be implemented on a single processor of a computer system, such as processor 1202 of system 1200. However, in additional embodiments, the disclosed computer-implemented methods may be implemented using one or more processors within a single computer system, and additionally or alternatively, on one or more processors within separate computer systems linked via a network.

Additionally, the computer-implemented methods described herein may be performed by hardware-based video codec (e.g., on-chip video codec 200 of FIG. 2) that encodes raw image data and generates compressed video content (e.g., in accordance with the H.264 standard for high definition video and the H.265 standard for high efficiency video coding). The disclosed embodiments are not limited to such on-chip video codecs, and in additional embodiments, a software-based video codec may be executed by a processor (e.g., processor 1202 of FIG. 12) to encode the raw image data and generate the compressed video content.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the invention being indicated by the following listing of exemplary claims.

The invention claimed is:

1. A computer-implemented method, comprising:
   receiving a stream of video content;
   encoding, using a video codec, the video content stream to generate compressed video data, the compressed video data comprising an intra-frame and a plurality of corresponding inter-frames; and
   storing the compressed video data within a buffer, wherein the encoding comprises:
   obtaining intra-frame data associated with the encoded intra-frame;
   encoding, based on the intra-frame data, a portion of the video content stream to generate a corresponding one of the inter-frames;
   determining whether an amount of compressed data stored in the buffer exceeds a first threshold value;
   when the amount of compressed data in the buffer exceeds the first threshold value, decoding the last generated inter-frame in the buffer and computing a viral intra-frame based on the decoded inter-frame data, the virtual intra-frame representing an out of sequence intra-frame in a group-of-pictures; and
   outputting the virtual intra-frame with the last generated inter-frame for storage in the buffer.

2. The method of claim 1, wherein the encoding further comprises encoding a first portion of the video content stream to generate the intra-frame, the first portion preceding the portion of the video content stream associated with the inter-frame.

3. The method of claim 1, wherein the encoding further comprises;
   computing a group-of-pictures length associated with the compressed video data, when the amount of buffered data fails to exceed the first threshold value;
   determining whether the computed group-of-pictures length exceeds a predetermined threshold length; and
   encoding an additional portion of the video content stream to generate an additional inter-frame, when the computed group-of-pictures length does not exceed the predetermined threshold length.

4. The method of claim 3, wherein:
   the buffer comprises one or more previously-encoded groups of intra-frames and corresponding inter-frames; and
   when the computed group-of-pictures length exceeds the predetermined threshold length, discarding the previously-encoded groups of intra-frames and corresponding inter-frames.

5. The method of claim 1, wherein the encoding further comprises determining whether the amount of buffered data exceeds a second threshold value, the second threshold value being larger than the first threshold value.

6. The method of claim 5, wherein the encoding further comprises maintaining the virtual intra-frame and discarding encoding video content preceding the virtual intra-frame, when the amount of buffered data exceeds the second threshold value.

7. The method of claim 1, further comprising:
   receiving information indicative of a triggering incident; and
   generating, based on the received information, an instruction to transmit at least a portion of the buffered data to a recipient.

8. The method of claim 7, wherein the triggering incident comprises at least one of a request for video content, an occurrence of a predetermined event within the received video stream, a receipt of predetermined data through an interface, or a detection of a predetermined event by a sensor.

9. The method of claim 7, wherein generating the instruction further comprises:
   determining whether the buffered data includes the intra-frame and the virtual intra-frame;
   discarding the virtual intra-frame and maintaining the corresponding inter-frame, when the buffered data includes the intra-frame and the virtual intra-frame; and generating the buffered data portion based on the intra-frame.

10. The method of claim 7, further comprising:
determining whether the buffered data includes the virtual intra-frame and fails to include the intra-frame; and
generating the buffered data portion based on the virtual intra-frame, when the buffered data includes the virtual intra-frame and fails to include the intra-frame.

11. The method of claim 1, further comprising:
receiving at least one frame of compressed video data;
decoding the received frame;
determining whether the decoded frame corresponds to an intra-frame; and
storing at least the decoded frame in a data repository, when the decoded frame corresponds to an intra-frame.

12. The method of claim 11, further comprising:
determining that the decoded frame corresponds to an inter-frame;
when the decoded frame is an inter-frame, computing a group-of-pictures length associated with the received data;
determining whether the computed group-of-pictures length exceeds a predetermined threshold length; and
storing at least the decoded inter-frame within the data repository, when the computer group-of-pictures length fails to exceed the predetermined threshold length.

13. The method of claim 12, further comprising:
generating an additional intra-frame based on the decoded inter-frame data, when the computed group-of-pictures length exceeds the predetermined threshold length; and
storing at least the additional intra-frame within the data repository.

14. An apparatus, comprising:
a video codec configured to encode a stream of video content to generate compressed video data, the compressed video data comprising an intra-frame and a plurality of corresponding inter-frames; and
a storage device couple to the video codec unit and configured to store the compressed video data within a buffer,
wherein the video codec is further configured to:
obtain intra-frame data associated with the encoded intra-frame;
encode, based on the intra-frame data, a portion of the video content stream to generate a corresponding one of the inter-frames;
determine whether an amount of compressed data stored in the buffer exceeds a first threshold value;
when the amount of compressed data in the buffer exceeds the first threshold value, decode the last generated inter-frame in the buffer and compute a virtual intra-frame based on the decoded inter-frame data, the virtual intra-frame representing an out of sequence intra-frame in a group-of-pictures; and
provide the virtual intra-frame with the last generated intra-frame as output for storage in the buffer.

15. The apparatus of claim 14, wherein the video codec is further configured to:
encode a first portion of the video content stream to generate the intra-frame, the first portion preceding the portion of the video content stream associated with the inter-frame.

16. The apparatus of claim 14, wherein the video codec is further configured to:
compute a group-of-pictures length associated with the compressed video data, when the amount of buffered data fails to exceed the first threshold value;

determine whether the computed group-of-pictures length exceeds a predetermined threshold length; and
encode an additional portion of the video content stream to generate an additional inter-frame, when the computed group-of-pictures length fails to exceed the predetermined threshold length.

17. The apparatus of claim 16, wherein:
the buffer comprises one or more previously-encoded groups of intra-frames and corresponding inter-frames; and
when the computed group-of-pictures length exceeds the predetermined threshold length, the video codec is further configured to discard the previously-encoded groups of inter-frames and corresponding inter-frames.

18. The apparatus of claim 14, wherein the video codec is further configured to:
determine whether the amount of buffered data exceeds a second threshold value, the second threshold value being larger than the first threshold value.

19. The apparatus of claim 18, wherein the vide coded is further configured to:
maintain the virtual intra-frame and discard encoded video content preceding the virtual intra-frame, when the amount of buffered data exceeds the second threshold value.

20. The apparatus of claim 14, wherein the video codec is further configured to:
receive information indicative of a triggering incident; and
generate, based on the received information, an instruction to transmit at least a portion of the buffered data to a recipient.

21. The apparatus of claim 20, wherein the video codec is further configured to:
determine that the buttered data includes the intra-frame and the virtual intra-frame;
discard the virtual intra-frame and maintain the corresponding inter-frame, when the buffered data includes the intra-frame and the virtual intra-frame; and
generate the buffered data portion based on the intra-frame.

22. The apparatus of claim 20, wherein the video is codec is further configured to:
determine whether the buffered data includes the virtual intra-frame and fails to include the intra-frame; and
generate the buffered data portion based on the virtual intra-frame, when the buffered data includes the virtual intra-frame and fails to include the intra-frame.

23. The apparatus of claim 14, wherein the video codec is further configured to:
receive at least one frame of compressed video data;
decode the received frame;
determine whether the decoded frame corresponds to an intra-frame; and
generate an instruction to store at least the decoded frame in the storage device, when decoded frame corresponds to an intra-frame.

24. The apparatus of claim 23, wherein the video codec is further configured to:
determine that the decoded frame corresponds to an inter-frame;
when the decoded frame is an inter-frame, compute a group-of-pictures length associated with the received data;
determine whether the computed group-of-pictures length exceeds a predetermined threshold length; and generate an instruction to store at least the decoded inter-frame within the storage device, when the computed group-of-pictures length fails to exceed the predetermined threshold length.

25. The apparatus of claim 24, wherein the video codec is further configured to:
  generate an additional intra-frame based on the decoded inter-frame data, when the computed group-of-pictures length exceeds the predetermined threshold length; and
  generate an instruction to store at least the additional intra-frame within the storage device.

26. A tangible, non-transitory computer-readable medium storing instructions that, when executed by at least one processor, cause the at least one processor to perform the steps of:
  encoding a stream of video content to generate compressed video data, the compressed video data comprising an intra-frame and a plurality of corresponding inter-frames; and
  storing the compressed video data within a buffer, wherein the encoding comprises:
    obtaining intra-frame data associated with the encoded intra-frame;
    encoding, based on the intra-frame data, a portion of the video content stream to generate a corresponding one of the inter-frames;
    determining whether an amount of compressed data stored in the buffer exceeds a first threshold value;
    when the amount of compressed data in the buffer exceeds the first threshold value, decoding the last generated inter-frame in the buffer and computing a virtual intra-frame based on the decoded inter-frame data, the virtual intra-frame representing an out of sequence intra-frame in a group-of-pictures; and
    outputting the virtual intra-frame with the last generated inter-frame for storage in the buffer.

* * * * *

UNITED STATES PATENT AND TRADEMARK OFFICE
CERTIFICATE OF CORRECTION

PATENT NO. : 9,813,732 B2
APPLICATION NO. : 14/411324
DATED : November 7, 2017
INVENTOR(S) : Stefan Lundberg It is certified that error appears in the above-identified patent and that said Letters Patent is hereby corrected as shown below:

In the Claims

In Claim 14, Column 33, Line 38, "a storage device couple to the video codec unit" should read --a storage device coupled to the video codec unit--.

In Claim 17, Column 34, Line 15, "groups of inter-frames and corresponding inter-frames" should read --groups of intra-frames and corresponding inter-frames--.

In Claim 19, Column 34, Line 21, "wherein the vide coded is" should read --wherein the video codec is--.

Signed and Sealed this
Twenty-seventh Day of March, 2018

Andrei Iancu
*Director of the United States Patent and Trademark Office*